(12) United States Patent
Alletto

(10) Patent No.: US 10,413,093 B2
(45) Date of Patent: Sep. 17, 2019

(54) PILLOW DISPLAY CART

(71) Applicant: BEDGEAR, LLC, Farmingdale, NY (US)

(72) Inventor: Eugene Alletto, Glen Head, NY (US)

(73) Assignee: BEDGEAR, LLC, Farmingdale, NY (US)

( * ) Notice: Subject to any disclaimer, the term of this patent is extended or adjusted under 35 U.S.C. 154(b) by 0 days.

(21) Appl. No.: 16/038,791

(22) Filed: Jul. 18, 2018

(65) Prior Publication Data

US 2018/0352975 A1 Dec. 13, 2018

Related U.S. Application Data

(63) Continuation of application No. 15/654,894, filed on Jul. 20, 2017, now abandoned, which is a continuation-in-part of application No. 13/944,973, filed on Jul. 18, 2013, now Pat. No. 9,721,317.

(51) Int. Cl.
| | |
|---|---|
| *A47F 7/00* | (2006.01) |
| *G09F 23/00* | (2006.01) |
| *G06Q 30/06* | (2012.01) |
| *A47F 5/10* | (2006.01) |
| *A47F 5/00* | (2006.01) |
| *A47F 7/30* | (2006.01) |
| *A47B 31/00* | (2006.01) |

(52) U.S. Cl.
CPC ............. *A47F 7/00* (2013.01); *A47F 5/0056* (2013.01); *A47F 5/108* (2013.01); *A47F 7/30* (2013.01); *G06Q 30/0629* (2013.01); *G09F 23/00* (2013.01); *A47B 2031/004* (2013.01)

(58) Field of Classification Search
CPC . A47F 7/00; A47F 5/108; G09F 23/00; G06Q 30/0629; G06Q 90/00; G06Q 99/00
USPC .... 211/40, 33, 186, 153, 134, 184; 108/182, 108/93, 157.13, 312, 118, 128; 312/118, 312/128
See application file for complete search history.

(56) References Cited

U.S. PATENT DOCUMENTS

| | | | | |
|---|---|---|---|---|
| 1,036,066 | A | * 8/1912 | Bown | A47B 53/02 |
| | | | | 312/198 |
| 1,275,205 | A | 8/1918 | Bigham et al. | |
| 2,575,661 | A | * 11/1951 | Hickey | A61G 12/001 |
| | | | | 211/85.14 |
| 2,696,419 | A | * 12/1954 | Wallance | A47B 67/00 |
| | | | | 312/265.3 |
| 2,827,141 | A | * 3/1958 | Kessler | E06B 3/6205 |
| | | | | 52/775 |
| 3,701,522 | A | * 10/1972 | Chi | B65H 45/20 |
| | | | | 270/40 |
| 4,019,793 | A | * 4/1977 | Gerding | A61G 12/001 |
| | | | | 312/209 |
| 4,309,784 | A | 1/1982 | Cohen | |

(Continued)

*Primary Examiner* — Michael Safavi
(74) *Attorney, Agent, or Firm* — Sorell, Lenna & Schmidt, LLP

(57) ABSTRACT

A pillow cart includes a frame having a lower portion that includes a lower support assembly and an upper support assembly. The frame has an upper portion that includes a top support assembly that is connected to the upper support assembly. A first tray is coupled to the lower support assembly. A second tray is coupled to the upper support assembly. A third tray is coupled to the top support assembly. A housing is coupled to the third tray. An electronic display is positioned within the housing.

20 Claims, 19 Drawing Sheets

(56) References Cited

U.S. PATENT DOCUMENTS

| | | | | |
|---|---|---|---|---|
| 4,410,093 A | * | 10/1983 | Chiariello | B42F 17/12 211/11 |
| 4,624,021 A | | 11/1986 | Hofstetter | |
| 4,725,066 A | * | 2/1988 | Nootenboom | B62B 3/006 211/126.15 |
| 4,731,890 A | | 3/1988 | Roberts | |
| 4,754,510 A | | 7/1988 | King | |
| 4,826,020 A | * | 5/1989 | Davis | A47B 81/067 211/133.1 |
| 4,832,271 A | | 5/1989 | Gelezlunas | |
| 4,858,259 A | | 8/1989 | Simmons et al. | |
| 4,876,835 A | * | 10/1989 | Kelley | A47B 21/06 211/190 |
| 5,148,706 A | | 9/1992 | Masuda et al. | |
| 5,167,377 A | | 12/1992 | Chalmers | |
| 5,314,243 A | * | 5/1994 | McDonald | A61G 12/001 221/2 |
| 5,380,079 A | * | 1/1995 | Hamilton | A47B 63/00 211/184 |
| 5,533,459 A | | 7/1996 | Fontana | |
| 5,540,354 A | | 7/1996 | Annand | |
| 5,727,266 A | | 3/1998 | Pang | |
| 5,805,455 A | * | 9/1998 | Lipps | A47F 3/005 221/17 |
| 5,991,945 A | | 11/1999 | Pang | |
| 6,119,736 A | * | 9/2000 | Huang | B62B 3/006 141/86 |
| 6,125,488 A | | 10/2000 | Vogland et al. | |
| 6,196,435 B1 | | 3/2001 | Wu | |
| 6,390,428 B1 | | 5/2002 | Oshima | |
| 6,557,325 B1 | * | 5/2003 | Katz | B65B 55/20 206/591 |
| 6,571,192 B1 | | 5/2003 | Hinshaw et al. | |
| 6,585,328 B1 | | 7/2003 | Oexman et al. | |
| 6,741,950 B2 | | 5/2004 | Hinshaw et al. | |
| 6,760,643 B2 | * | 7/2004 | Lipps | A61G 12/001 221/2 |
| 6,760,935 B1 | | 7/2004 | Burton et al. | |
| 6,981,288 B1 | | 1/2006 | Hu | |
| 6,997,070 B2 | | 2/2006 | Killingbeck | |
| 7,124,652 B2 | | 10/2006 | Killingbeck | |
| 7,467,058 B2 | | 12/2008 | Boyd | |
| 7,516,569 B2 | | 4/2009 | Garcia | |
| 7,523,513 B2 | | 4/2009 | Waters et al. | |
| 7,600,335 B2 | | 10/2009 | Suprina | |
| RE41,809 E | | 10/2010 | Hinshaw et al. | |
| 7,877,916 B2 | | 2/2011 | Chamandy | |
| 7,937,238 B2 | | 5/2011 | Boyd | |
| 7,937,239 B2 | | 5/2011 | Boyd | |
| 8,015,640 B2 | | 9/2011 | Sun | |
| 8,094,043 B2 | | 1/2012 | Calhoun et al. | |
| 8,117,700 B2 | | 2/2012 | Howard | |
| 8,171,601 B1 | * | 5/2012 | Yurkon | D01B 3/00 19/200 |
| 8,195,328 B2 | * | 6/2012 | Mallett | A61L 11/00 221/102 |
| 8,231,016 B2 | | 7/2012 | Berdahl et al. | |
| 2003/0129904 A1 | | 7/2003 | Wolynes et al. | |
| 2003/0188383 A1 | | 10/2003 | Ense | |
| 2005/0055917 A1 | * | 3/2005 | Dubensky | E04B 1/3483 52/302.1 |
| 2005/0212241 A1 | * | 9/2005 | Stone | A47B 47/03 280/79.3 |
| 2005/0257410 A1 | | 11/2005 | Horowitz et al. | |
| 2006/0059756 A1 | | 3/2006 | Wells | |
| 2006/0230992 A1 | * | 10/2006 | Newhouse | A47B 9/18 108/147 |
| 2006/0231517 A1 | * | 10/2006 | Bothun | A47F 5/08 211/151 |
| 2006/0266770 A1 | * | 11/2006 | Fitzgerald | A61G 12/001 222/137 |
| 2007/0052333 A1 | * | 3/2007 | Freire | A47B 47/005 312/265.4 |
| 2007/0221194 A1 | * | 9/2007 | Bruno | A47J 37/0704 126/50 |
| 2008/0063573 A1 | * | 3/2008 | Ammann | B01L 7/52 422/105 |
| 2008/0154670 A1 | | 6/2008 | McAlhaney | |
| 2009/0026732 A1 | * | 1/2009 | Lindner | B62B 3/008 280/638 |
| 2009/0046071 A1 | * | 2/2009 | Griffin | G06F 1/1626 345/173 |
| 2009/0188048 A1 | | 7/2009 | Shlomo | |
| 2011/0132854 A1 | | 6/2011 | Berdahl et al. | |
| 2011/0187244 A1 | | 8/2011 | Schachte | |
| 2011/0267782 A1 | * | 11/2011 | Petrick | G06F 1/1628 361/724 |
| 2011/0291372 A1 | * | 12/2011 | Stryker | A61G 12/001 280/47.35 |
| 2011/0302713 A1 | | 12/2011 | Martenson | |
| 2012/0087074 A1 | * | 4/2012 | Chen | G06F 1/1632 361/679.02 |
| 2012/0180214 A1 | | 7/2012 | Borgione | |
| 2013/0027497 A1 | * | 1/2013 | Terrill | B41J 29/13 347/222 |
| 2013/0200584 A1 | * | 8/2013 | Guasta | B62B 3/005 280/79.2 |
| 2014/0049014 A1 | * | 2/2014 | Schumacher | B62B 3/005 280/47.35 |
| 2015/0076779 A1 | * | 3/2015 | Lindblom | A47F 5/137 280/47.35 |
| 2015/0282611 A1 | * | 10/2015 | Herring | H02G 3/22 29/505 |
| 2015/0320624 A1 | * | 11/2015 | Woodman | A61G 1/0237 280/79.2 |
| 2016/0297458 A1 | * | 10/2016 | Churchvara | B62B 3/02 |

\* cited by examiner

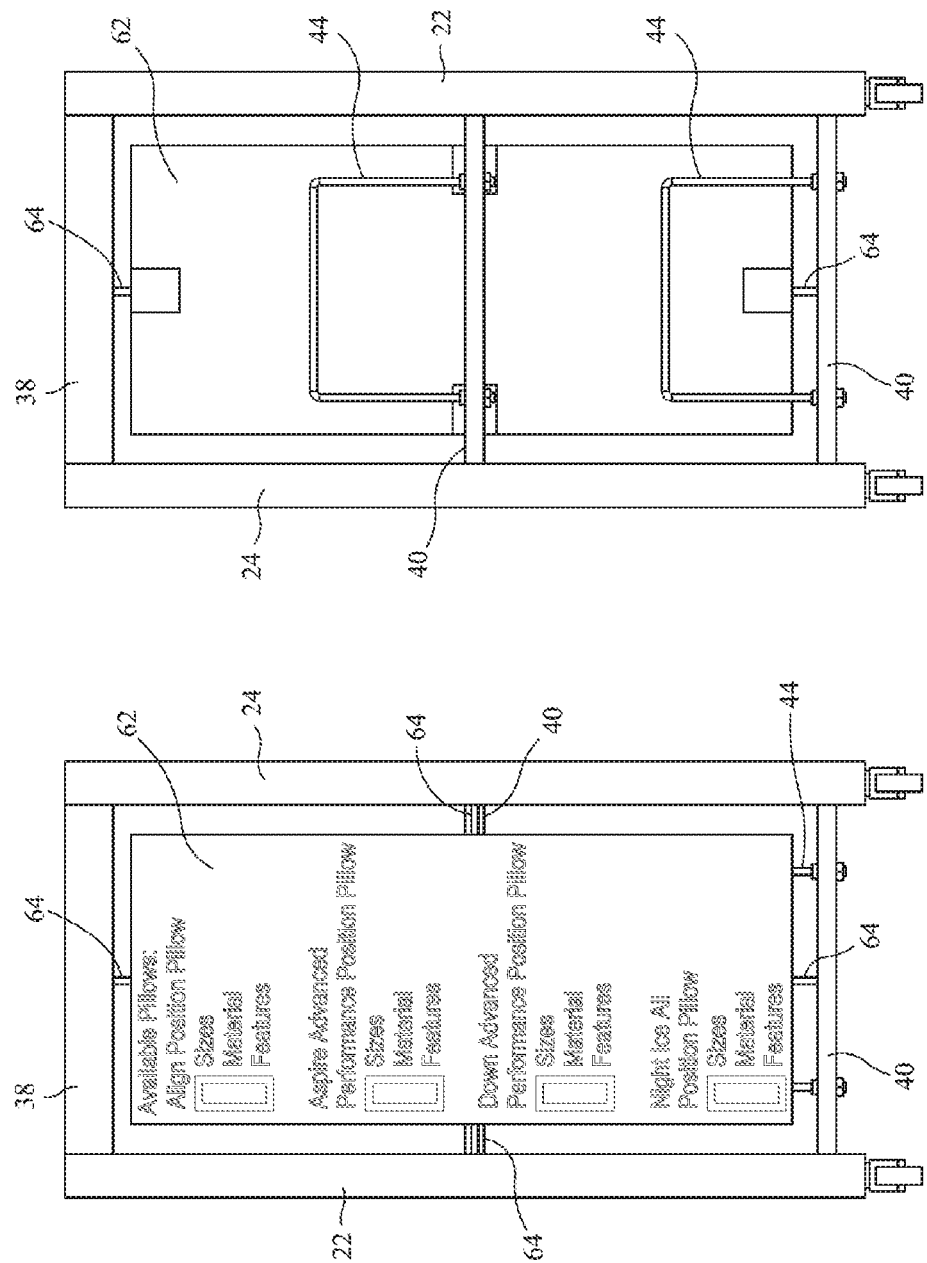

PILLOW DISPLAY CART

CROSS REFERENCE TO RELATED APPLICATIONS

This application is a continuation of U.S. patent application Ser. No. 15/654,894, filed Jul. 20, 2017, which is a continuation-in-part of and claims priority to U.S. patent application Ser. No. 13/944,973 filed on Jul. 18, 2013. These references are expresssly incorporated herein by reference, in their entireties.

TECHNICAL FIELD

The present disclosure generally relates to carts used to store and display items such as, for example, bedding, and more particularly to a mobile cart for storing and displaying pillows, wherein the cart is adapted for use in a location, such as, for example, a retail store and includes plurality of pillows each having a different configuration. Methods of use are provided.

BACKGROUND

Sleep is critical for people to feel and perform their best, in every aspect of their lives. Sleep is an essential path to better health and reaching personal goals. Indeed, sleep affects everything from the ability to commit new information to memory to weight gain. It is therefore essential for people to use bedding that suit both their personal sleep preference and body type in order to achieve comfortable, restful sleep.

Mattresses have been developed to suit various sleep preferences and body types. For example, mattresses vary according to certain characteristics, such as, for example, material and firmness so that a person may select a mattress that will achieve maximum spinal alignment, and, in turn, comfort. However, selecting an appropriate mattress alone may not ensure comfortable, restful sleep. Indeed, it is estimated that a proper mattress will only provide about 70% of the spinal alignment needed to achieve maximum comfort. The remaining 30% of the spinal alignment needed to achieve maximum comfort is provided by a pillow.

It is therefore beneficial to select a pillow based on the type of mattress being used, and vice versa. That is, the type of pillow used should be selected based upon, at least in part, the type of mattress used so that the mattress/pillow combination achieves maximum spinal alignment, and hence comfort. However, pillows are typically selected based solely on size or material, for example. Little or no consideration is given to the type of mattress the person uses. This disclosure describes an improvement over these prior art technologies.

SUMMARY

In one embodiment, in accordance with the principles of the present disclosure, a pillow cart is provided that includes a frame comprising a lower portion and an upper portion. The lower portion comprises a lower support assembly having a polygonal configuration, an upper support assembly having a polygonal configuration, and spaced apart vertical members that extend between and connect the lower support assembly and the upper support assembly. The upper portion comprises a top support assembly having a polygonal configuration and spaced apart vertical members that extend between and connect the upper support assembly and the top support assembly. A first tray is coupled to the lower support assembly. The first tray comprises a plurality of spaced apart dividers. A second tray is coupled to the upper support assembly. The second tray comprises a plurality of spaced apart dividers. A third tray is coupled to the top support assembly. A housing is coupled to the third tray. An electronic display is positioned within the housing.

In one embodiment, in accordance with the principles of the present disclosure, a pillow cart is provided that includes a frame comprising a lower portion and an upper portion. The lower portion comprises a lower support assembly having a rectangular configuration, an upper support assembly having a rectangular configuration, and spaced apart vertical members that extend between and connect the lower support assembly and the upper support assembly. The upper portion comprises a top support assembly having a rectangular configuration and spaced apart vertical members that extend between and connect the upper support assembly and the top support assembly. Two of the vertical members of the upper portion are each concentric with one of the vertical members of the lower portion. Two of the vertical members of the upper portion are each nonconcentric with the vertical members of the lower portion. A first tray is coupled to the lower support assembly. The first tray comprises a plurality of spaced apart dividers. A second tray is coupled to the upper support assembly. The second tray comprises a plurality of spaced apart dividers. A third tray is coupled to the top support assembly. A housing is coupled to the third tray. An electronic display is positioned within the housing.

In one embodiment, in accordance with the principles of the present disclosure, a pillow cart is provided that includes a frame comprising a lower portion and an upper portion. The lower portion comprises first, second, third and fourth vertical support members, first and second side support members that each extend between and connect the first and second vertical support members, third and fourth side support member that each extend between and connect the third and fourth vertical support members, first and second rear support member that each extend between and connect the first and third vertical support members, and first and second front support members that each extend between and connect the second and fourth vertical support members. The upper portion comprises first, second, third and fourth vertical support members, the first vertical support members being coaxial, the third vertical support members being coaxial, the second vertical support member of the upper portion having a distal end that engages the first side support member between the first and second vertical support members of the lower portion, the fourth vertical support member of the upper portion having a distal end that engages the second side support member between the third and fourth vertical support members of the lower portion. A first side support member of the upper portion extends between and connects the first and second vertical support members of the upper portion. A second side support member of the upper portion extends between and connects the third and fourth vertical support members of the upper portion. A rear support member of the upper portion extends between and connects the first and third vertical support members of the upper portion. A front support member of the upper portion extends between and connects the second and fourth vertical support members of the upper portion. Casters are coupled to distal ends of each of the vertical support members of the lower portion of the frame. A first tray is positioned on top of tabs that extend from inner surfaces of the second and fourth side support members of the lower portion and the second rear and second front support members of the lower portion. The first tray comprises a cutout and a plurality of spaced apart dividers. A second tray is positioned on top of tabs that extend from inner surfaces of the first and third side support members of the lower portion and the first rear and first front support members of the lower portion. The second tray comprises a cutout and a plurality of spaced apart dividers. A third tray is positioned on top of the first and second vertical support surfaces of the upper portion and the front and rear support members of the upper portion. The third tray comprises a hole that extends through a thickness of the third tray. A housing is coupled to the third tray. An electronic display is positioned within the housing. The electronic display comprises a touch screen and wiring that extends from the electronic display and through the hole and the cutouts. A bracket has a first side that is coupled to the first vertical support members, a second side that is coupled to the third vertical support members and a horizontal portion that is coupled to the second rear support member. A panel positioned within the bracket.

BRIEF DESCRIPTION OF THE DRAWINGS

The present disclosure will become more readily apparent from the specific description accompanied by the following drawings, in which:

FIG. 11 is an end view of the component shown in FIG. 9;

FIG. 12 is an end view of the component shown in FIG. 9;

Like reference numerals indicate similar parts throughout the figures.

DETAILED DESCRIPTION

Figure 1:
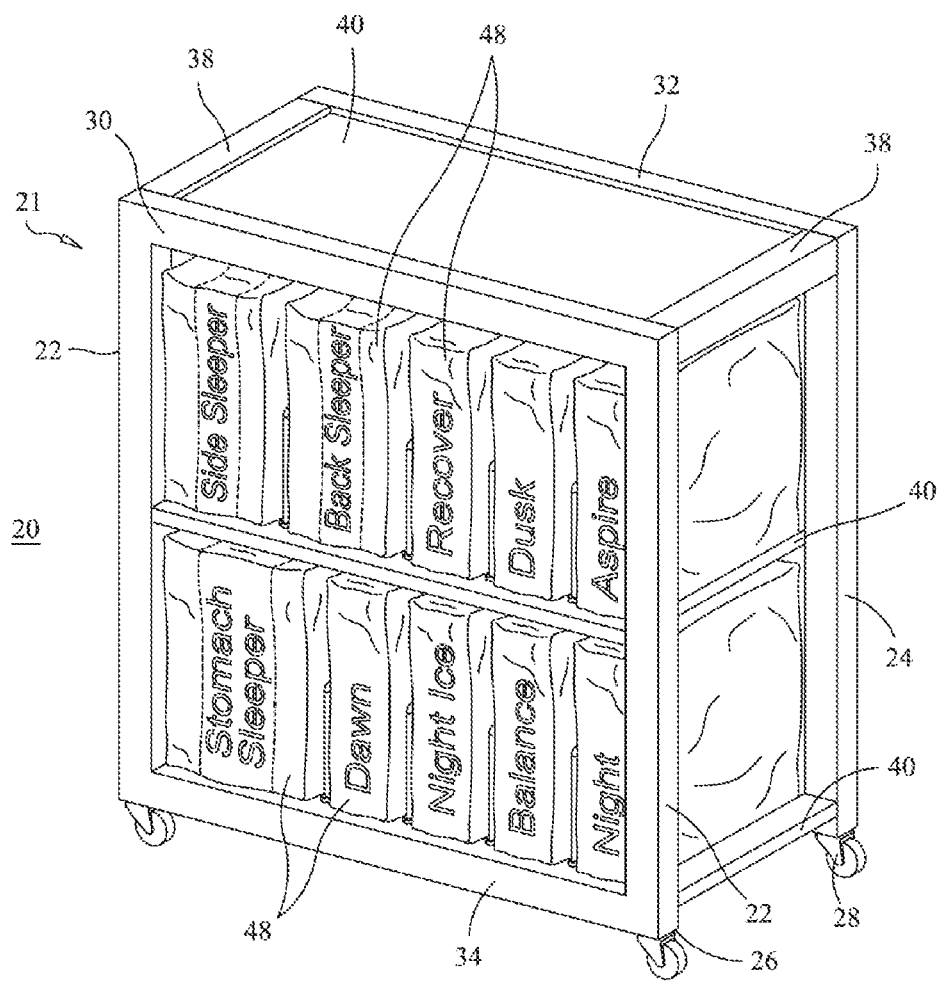
FIG. 1 is a perspective view of one embodiment of a pillow display system in accordance with the principles of the present disclosure.
Figure 2:
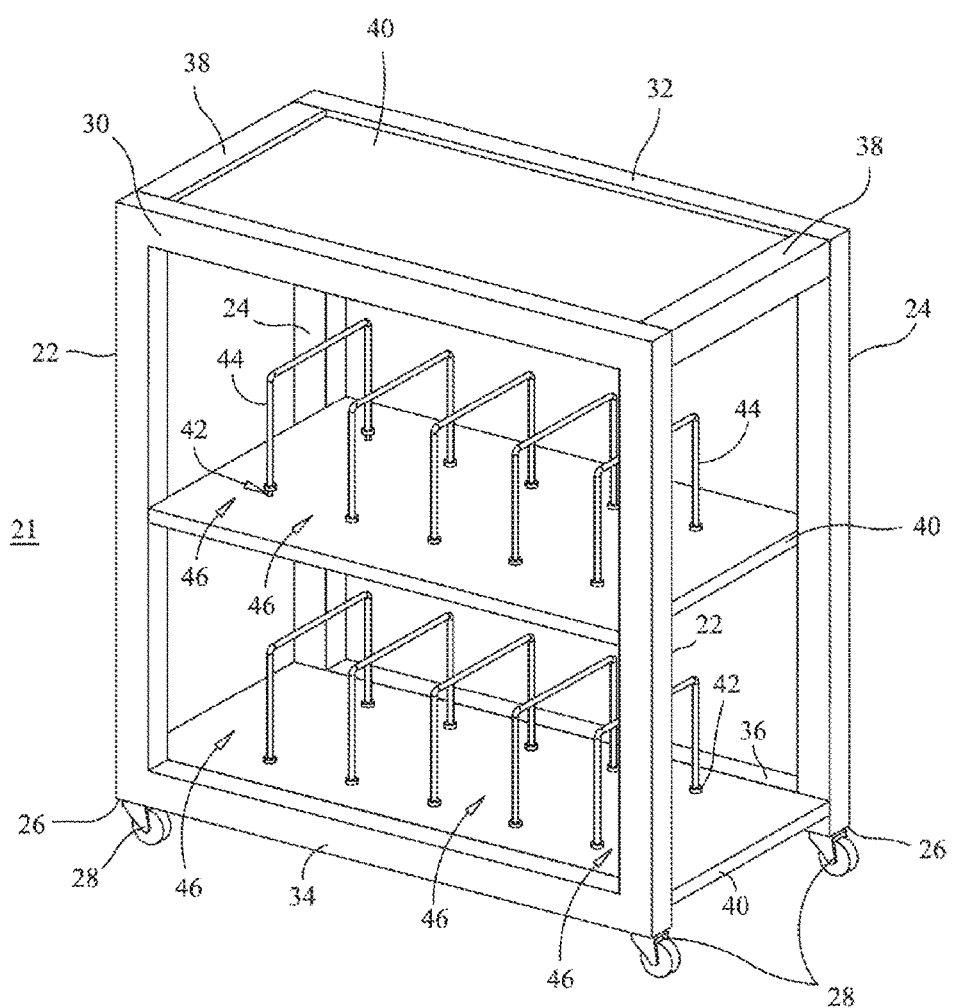
FIG. 2 is a perspective view of a component of the pillow display system shown in FIG. 1.
Figure 3:
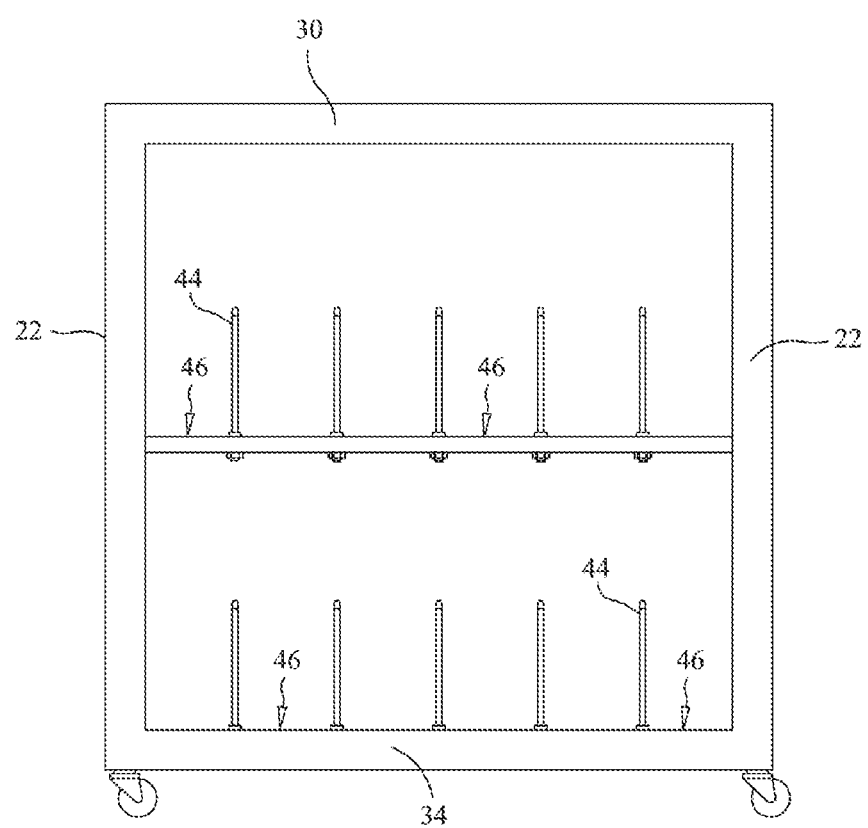
FIG. 3 is a side view of a component of the system shown in FIG. 1.
Figure 4:
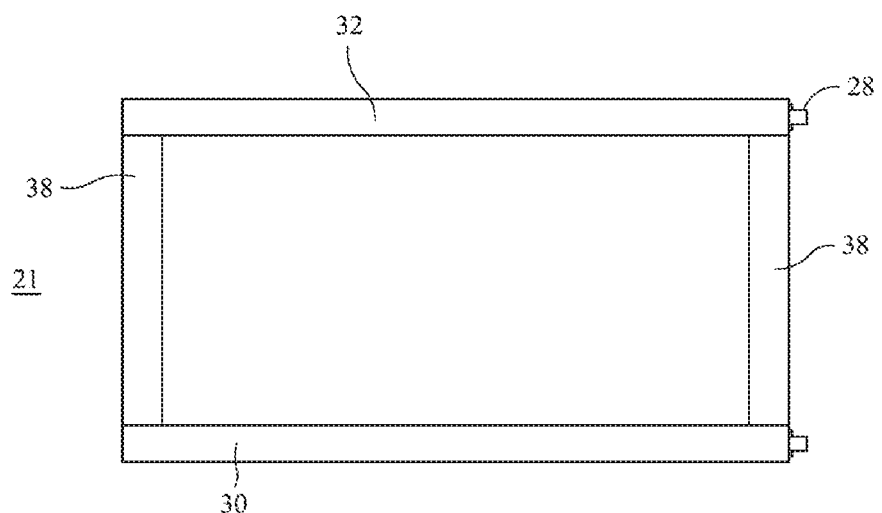
FIG. 4 is a top view of a component of the system shown in FIG. 1.
Figure 5:
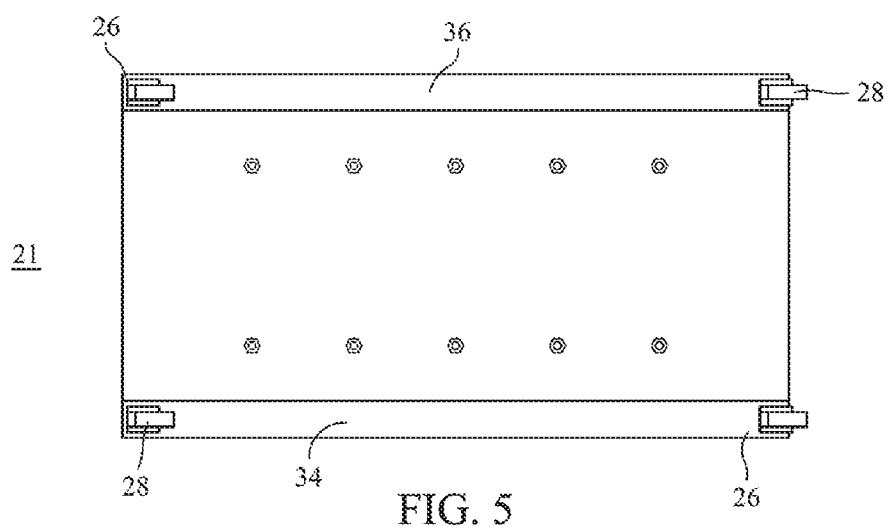
FIG. 5 is a bottom view of a component of the system shown in FIG. 1.
Figure 6:
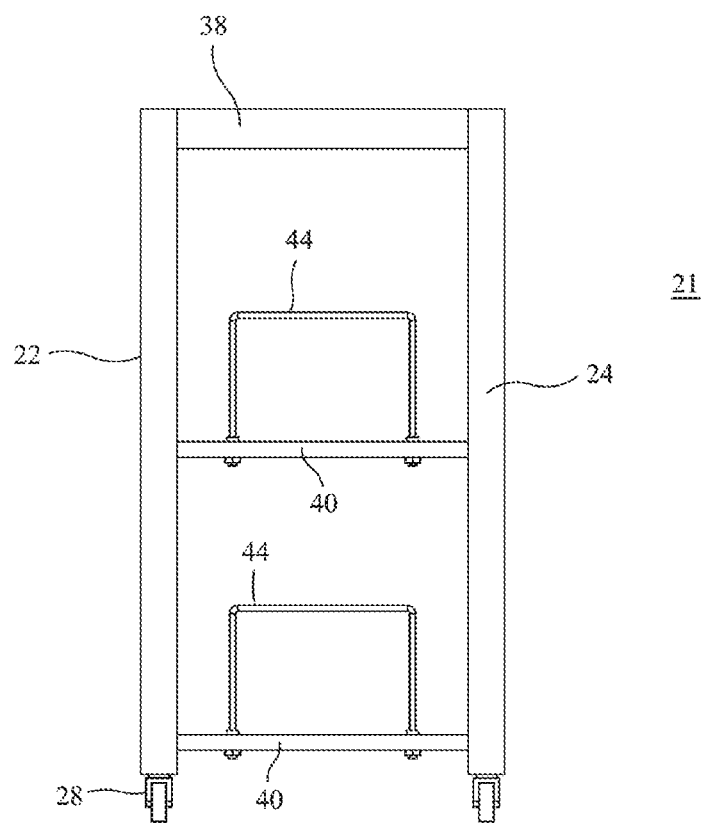
FIG. 6 is an end view of a component of the system shown in FIG. 1.

The exemplary embodiments of a pillow display system and related methods of use are discussed in terms of devices to store and display bedding for marketing purposes. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a pillow display system, related components and methods of employing the pillow display system in accordance with the principles of the present disclosure. Alternate embodiments are also disclosed. Reference will now be made in detail to the exemplary embodiments of the present disclosure, which are illustrated in the accompanying figures. Turning to FIGS. 1-6, there are illustrated components of a pillow display system 20.

System 20 includes a cart having a plurality of compartments. At least two of the compartments include a pillow disposed therein. In some embodiments, each pillow is disposed in a compartment such that information, such as, for example, a logo, brand name or model name is visible. Each of the pillows has a different configuration. For example, one of the pillows may be configured for people who sleep on their stomach and another pillow may be configured for people who sleep on their back or for people who sleep on their side. The pillows may also be made from different materials, have different sizes, have different shapes and/or include unique characteristics configured to enhance performance. It is envisioned that the cart may include two or more compartments such that the cart holds two or more pillows. In one embodiment, the cart is configured to hold twelve pillows at arm level to facilitate access to each of the pillows for sleep demonstrations and/or comparative testing. In one embodiment, the cart is configured to hold twelve pillows at waist level to facilitate access to each of the pillows for sleep demonstrations and/or comparative testing.

In some embodiments, system 20 is configured for use in a retail store. It is envisioned that system 20 may be used in a retail store that has mattresses in its showroom. In particular, the cart is configured to be moved to a location adjacent at least one of the mattresses in the showroom such that a consumer can lie on the mattress and test each of the pillows included in the cart without having to get up from the mattress or move very far from the mattress. Moreover, the cart can be moved from mattress to mattress, so that the consumer can test each of a plurality of different pillows with a plurality of different mattresses. This allows the consumer to select a pillow that provides the greatest comfort in combination with the mattress being tested so that the consumer may arrive at the mattress/pillow combination that provides optimal spinal alignment, and hence comfort. In some embodiments, the cart includes a plurality of wheels or casters that allow the cart to roll such that the cart is easily movable to different areas of the showroom for positioning adjacent different mattresses, for example, to determine the optimal pillow/mattress combination for a specific consumer.

In some embodiments, the cart comprises a container or dispenser, such as, for example, a cardboard box that includes one or more disposable barriers, such as, for example, sleep napkins that are configured to be placed between a pillow and the consumer's face to avoid contaminating the pillows with dirt and/or oil from the consumer's face as well as to protect the consumer from the same. In one embodiment, the cart holds the box or other container of sleep napkins at waist level to facilitate access to the sleep napkins for sleep demonstrations and comparative testing. In another embodiment, the cart holds the box or other container of sleep napkins above waist level to facilitate access to the sleep napkins for sleep demonstrations and comparative testing.

In some embodiments, the cart includes a section having demonstration jars and/or flasks that is spaced apart from the compartments in which the pillows are disposed. It is envisioned that the jars and/or flasks may include samples of material from which the mattresses and/or pillows are made and/or a means to demonstrate certain performance characteristics of the mattresses and/or the pillows. It is further envisioned that the jars and/or flasks may include samples of material from which a mattress protector that forms a removable barrier configured to prevent contamination of a mattress is made and/or a means to demonstrate certain performance characteristics of the mattress protector. It is contemplated that the cart may include one or a plurality of jars and/or flasks. In some embodiments, the jars and/or flasks are positioned on an upper surface of the cart such that consumers can easily access and manipulate the jars and/or flasks. These jars and/or flasks are designed to be used simultaneously with the sleep napkins as well as an interactive monitor such as an iPad® for demonstration purposes and product information.

In some embodiments, the system includes graphic display signage positioned on or adjacent the cart. In one embodiment, the graphic display signage provides details or instructions that teach a consumer how to choose a pillow among the pillows provided in the cart that will provide the proper spinal alignment in combination with a selected mattress. In one embodiment, the graphic display signage provides details or instructions that teach a consumer how to choose a pillow among the pillows provided in the cart that will improve spinal alignment independent of the mattress used. In some embodiments, the graphic display signage provides information regarding one or more of the pillows provided in the cart, such as, for example, the material or materials used to make each pillow, structural characteristics of each pillow and the benefits provided by each pillow.

In some embodiments, the system includes an interactive device such as, for example, a computer, electronic notebook or electronic tablet such as, for example, an IPAD coupled to the cart to provide product information about the pillows provided in the cart. It is envisioned that the interactive device may also provide details or instructions that teach a consumer how to choose a pillow among the pillows provided in the cart that will provide maximum spinal alignment, with or without a particular mattress. It is further envisioned that the interactive device can be configured to provide a side-by-side comparison of two or more of the pillows provided in the cart and/or select a pillow from the pillows provided in the cart that provides a particular consumer with the best spinal alignment based upon data entered into the interactive device by the consumer such as, for example, body weight and/or type and/or the consumer's sleep position preference (stomach sleeper, back sleeper, side sleeper).

The components of system 20 can be fabricated from materials including metals, polymers and/or composites, depending on the particular application. For example, the components of system 20, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 20 may have material composites, including the above materials, to achieve various desired characteristics such as strength, rigidity, elasticity, performance and durability. The components of system 20, individually or collectively, may also be fabricated from a heterogeneous material such as a combination of two or more of the above-described materials. The components of system 20 can be extruded, molded, injection molded, cast, pressed and/or machined. The components of system 20 may be monolithically formed, integrally connected or include fastening elements and/or instruments, as described herein.

System 20 includes a cart 21 comprising a first pair of vertical support members 22 extending parallel to one another and a second pair of vertical support members 24 extending parallel to one another. The first pair of vertical support members 22 extend parallel to the second pair of vertical support members 24 such that the first and second pairs of support members 22, 24 define a polygonal cross-sectional configuration. Support members 22, 24 each extend along a longitudinal axis between a proximal end and a distal end. The distal ends of each support member 22, 24 includes a distal face 26 having a caster 28 coupled thereto. It is envisioned that casters 28 may be rigid casters, swivel casters, braking casters or locking casters, depending upon the particular application. In one embodiment, casters 28 and vertical support members 22, 24 are integrally formed or monolithic. In some embodiments, casters 28 are coupled to distal faces 26 by frictional engagement, threaded engagement, mutual grooves, screws, adhesive, nails, barbs and/or raised element, depending upon the particular application.

A first upper cross member 30 extends between and connects the proximal ends of support members 22 and a second upper cross member 32 extends between and connects the proximal ends of support members 24. Cross members 30, 32 extend parallel to one another. A first lower cross member 34 extends between and connects the distal ends of support members 22 and a second lower cross member 36 extends between and connects the distal ends of support members 24. Cross members 34, 36 extend parallel to one another. In some embodiments, cross members 30-36 each extend perpendicular to each of the axes.

Support members 22 are integrally formed with cross members 30, 34 and support members 24 are integrally formed with cross members 32, 36. That is, support members 22 and cross members 30, 34 define a unitary first frame portion and support members 24 and cross members 32, 36 define a unitary second frame portion. It is envisioned that the first and second frame portions can have various shape configurations, such as, for example, rectangular, square, polygonal, irregular, uniform, non-uniform, variable and/or tapered, depending upon the particular application. It is envisioned that support members 22 and cross members 30, 34 may be separate components and that support members 24 and cross members 32, 36 may be separate components, wherein the components are connected by frictional engagement, threaded engagement, mutual grooves, screws, adhesive, nails, barbs and/or raised element, depending upon the particular application.

A pair of horizontal support members 38 each extend between and connect the proximal end of one vertical support member 22 and the proximal end of one vertical support member 24. In one embodiment, horizontal support members 38 are integrally formed with vertical support members 22, 24. In some embodiments horizontal support members 38 are connected to vertical support members 22, 24 by frictional engagement, threaded engagement, mutual grooves, screws, adhesive, nails, barbs and/or raised element, depending upon the particular application. In some embodiments, horizontal support members 38 are not included. In some embodiments, cart 21 includes a second pair of horizontal support members (not shown) each extending between and connecting the distal end of one vertical support member 22 and the distal end of one vertical support member 24 such that the second pair of horizontal support members extend parallel to horizontal support members 38.

At least one tray 40 is positioned between the first and second pairs of support members 22, 24 such that tray 40 is positioned between a support member 22 and a support member 24 without being positioned between support members 22, 22 or support members 24, 24. In some embodiments, cart 21 includes at least one tray 40 simultaneously positioned between support members 22, 22 and between support members 24, 24. In some embodiments, cart 21 includes a plurality of spaced apart trays 40. In some embodiments, cart 21 includes at least one tray positioned between a support member 22 and a support member 24 without being positioned between support members 22, 22 or support members 24, 24 and at least one tray 40 simultaneously positioned between support members 22, 22 and between support members 24, 24.

It is envisioned that at least one tray 40 may be positioned at waist level and/or at arm level to facilitate access to items positioned on trays 40 by a consumer or sales representative, for example, while he or she is standing. In some embodiments, at least one tray 40 is positioned at or below waist level to facilitate access to items positioned on the tray 40 by a consumer while he or she is lying on a mattress. In some embodiments, trays 40 are integrally formed with support members 22, 24. In some embodiments, trays 40 are connected to support members 22, 24 by frictional engagement, threaded engagement, mutual grooves, screws, adhesive, nails, barbs and/or raised element, depending upon the requirements of a particular application. In some embodiments, support members 22, 24 each include a projection, such as, for example, a flange such that the projections are aligned vertically; tray 40 rests on the aligned projections such that tray 40 is parallel with cross members 34, 36.

In some embodiments, tray 40 comprises a plurality of spaced apart openings 42. Two openings 42 that define a line extending parallel to horizontal support members 38 have a wire divider 44 disposed therein such that divider 44 also extends parallel horizontal support members 38. In some embodiments, dividers 44 comprise a rigid material that resists bending. In some embodiments, dividers 44 comprise a flexible and/or elastic material. Each divider 44 has a pair of threaded ends that extend through tray 40 and engage a threaded nut to fix divider 44 relative to tray 40. The space between adjacent dividers 44 defines a compartment 46, as does the space between an outermost divider 44 and support members 22, 24. In some embodiments, openings 42 are positioned such that dividers 44 extend at an acute angle relative to horizontal support members 38 to allow items positioned in compartments 46 to be displayed at an angle to show a perspective view of the items, depending upon the requirements of a particular application. In some embodiments, dividers 44 are uniformly spaced to facilitate items of substantially equal size and shape that are placed in compartments 46. In some embodiments, the space between adjacent dividers is non-uniform to accommodate items in compartments having different sizes and shapes.

A pillow 48 is positioned in at least two of compartments 46. In some embodiments, a pillow is positioned in each of compartments 46. In some embodiments, pillows 48 are positioned in compartments such that indicia on pillows 48, such as, for example, a brand or model name or marketing information attached to pillows 48 such as, for example, a tag is viewable from an exterior of cart 21. This allows a consumer to identify each pillow 48 and/or read marketing information regarding each pillow 48 without removing a respective pillow 48 from a respective compartment 46. Each of pillows 48 have a different configuration. For example, it is envisioned that pillows 48 may differ from one another with respect to size, material, and/or shape. It is envisioned that cart 21 may include at least one pillow 48 having a filler comprising latex, at least one pillow 48 having a filler comprising memory foam, at least one pillow 48 having a filler comprising a gel and/or at least one pillow having a filler comprising a down-alternative hypoallergenic material.

In some embodiments, at least one of pillows 48 has gusseted sides and at least one of pillows 48 does not. It is envisioned that the gusseted sides may comprise a breathable fabric that is different than the material(s) that comprise the remaining portions of a respective pillow 48. In some embodiments, at least one of pillows 48 has gusseted sides positioned between front and back panels that are not gusseted and at least one of pillows 48 does not. In some embodiments, at least one of pillows 48 has gusseted sides positioned between front and back panels, wherein at least one of the front and back panels is also gusseted and at least one of pillows 48 does not. In some embodiments, at least one of pillows 48 has a removable core and at least one of pillows 48 does not. In some embodiments, at least one of pillows 48 has a shell including a zipper along a front bottom edge and removable core disposed within the shell and at least one of pillows 48 does not. In some embodiments, at least one of pillows 48 has a self-leveling core and at least one of pillows 48 does not. In some embodiments, at least one of pillows 48 has a shock absorber core comprising visco-memory foam and gel fiber and at least one of pillows 48 does not. In some embodiments, at least one of pillows 48 has a latex core that is blended with gel-fiber clusters and at least one of pillows 48 does not. In some embodiments, at least one of pillows 48 has a resilient core and at least one of pillows 48 does not. In some embodiments, at least one of pillows 48 has metallic corded seams and at least one of pillows 48 does not. In some embodiments, at least one of pillows 48 has metallic corded seams and gusseted sides and at least one of pillows 48 does not. In some embodiments, at least one of pillows 48 comprises a moisture-wicking, stain-resistant fabric, such as, for example, DRI-TEC® sold by BEDGEAR™ of Farmingdale, N.Y. (see bedgear.com, the contents of which are incorporated herein by reference), and at least one of pillows 48 does not. In some embodiments, at least one of pillows 48 comprises a solid latex and solid memory foam blend and at least one of pillows 48 does not. In some embodiments, at least one of pillows 48 has mesh sidewalls and at least one of pillows 48 does not. In some embodiments, at least one of pillows 48 has mesh sidewalls and a filter fabric behind the mesh sidewalls and at least one of pillows 48 does not. In some embodiments, at least one of pillows 48 has a liquid layer and at least one of pillows 48 does not.

People tend to sleep on their stomach, back or side. When people sleep on their stomach, their shins make contact with the mattress and their body weight is evenly distributed. Adequate support under the person's hips keeps his or her body aligned. A pillow for people that sleep on their stomach must therefore support the person's head and neck for proper spinal alignment. When people sleep on their back, the backs of their legs make contact with a comfort layer of the mattress such that that the person's body weight is evenly distributed. Adequate support under the person's hips keeps his or her body aligned. A pillow for people that sleep on their back must therefore support the person's head and neck for proper spinal alignment. When people sleep on their side, their hips are aligned with the rest of his or her body and his or her shoulders sink into a comfort layer of the mattress. A pillow for people that sleep on their side must therefore support the person's head and neck for proper spinal alignment.

In some embodiments, cart 21 includes at least two pillows 48 configured for people that sleep on their stomach, at least two pillows 48 configured for people that sleep on their back and at least two pillows 48 configured for people that sleep on their side. It is envisioned that at least one of the pillows 48 configured for people that sleep on their stomach differs with respect to size, shape, or material relative to another pillow 48 configured for people that sleep on their stomach; at least one of the pillows 48 configured for people that sleep on their back differs with respect to size, shape, or material relative to another pillow 48 configured for people that sleep on their back; and at least one of the pillows 48 configured for people that sleep on their side differs with respect to size, shape, or material relative to another pillow 48 configured for people that sleep on their side.

In some embodiments, pillows 48 include at least one pillow 48 with a mesh gusset, as shown in U.S. Pat. No. D672,183, which issued as a United States Design Patent on Dec. 11, 2012, the contents of which are incorporated herein by reference. In some embodiments, pillows 48 include at least one pillow 48 with a mesh gusset, as shown in U.S. Pat. No. D672,184, which issued as a United States Design Patent on Dec. 11, 2012, the contents of which are incorporated herein by reference. In some embodiments, pillows 48 include at least one pillow 48 with a mesh gusset, as shown in U.S. Pat. No. D672,186, which issued as a United States Design Patent on Dec. 11, 2012, the contents of which are incorporated herein by reference.

Figure 7:
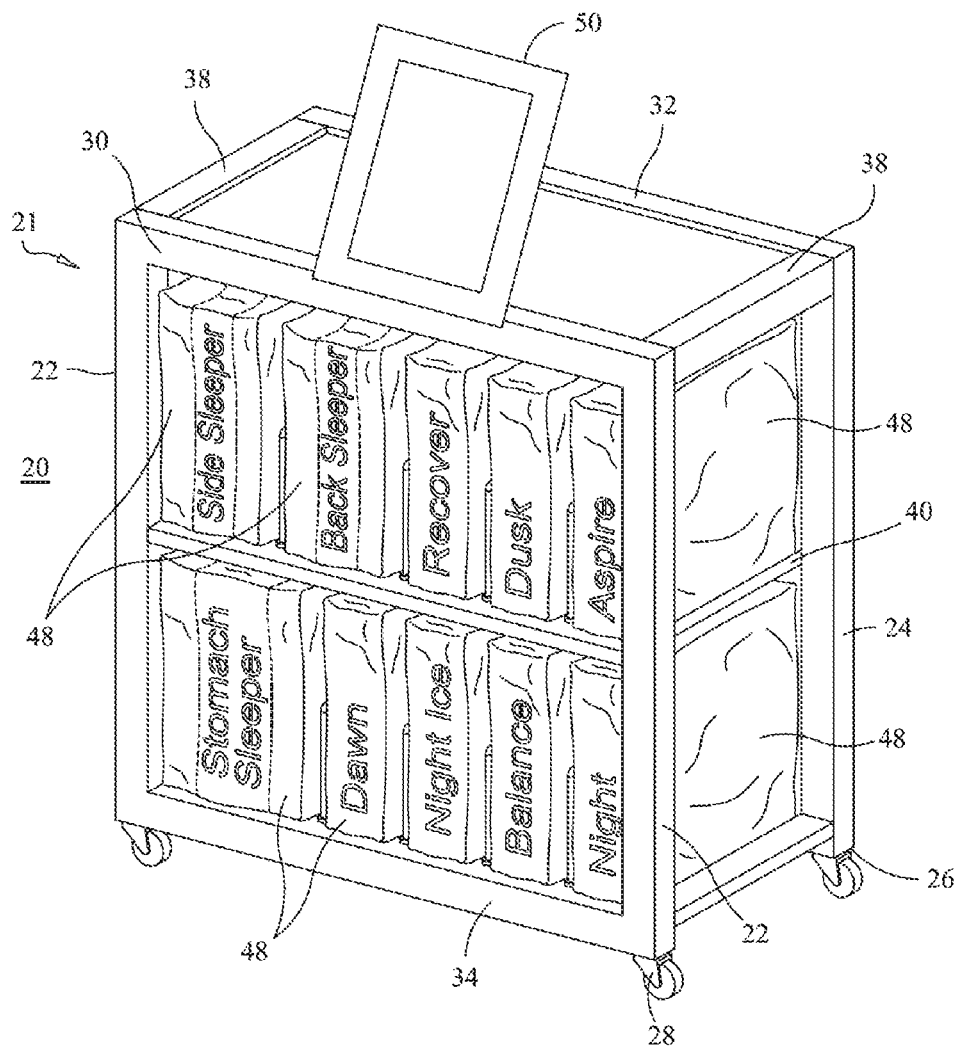
FIG. 7 is a perspective view of one embodiment of a pillow display system in accordance with the principles of the present disclosure.

In one embodiment, shown in FIG. 7, system 20 includes an interactive device 50, such as, for example a computer tablet device, IPAD, IPOD, electronic reader device (e-Reader), personal data assistant (PDA), computer notebook device or smart phone. In some embodiments, interactive device 50 includes a keyboard, a touch screen, or both. In some embodiments, interactive device 50 is coupled to cart 21 by a bracket, for example. It is envisioned that the bracket may be fixed to cart 21 such that the bracket allows interactive device 50 to pivot relative to cart 21. In some embodiments, interactive device 50 is fixed to cart 21. It is envisioned that interactive device 50 may be positioned anywhere relative to cart 21. For example, interactive device 50 may be coupled to cross member 30, cross member 32, cross member 34, cross member 36, support members 38 or trays 40. In some embodiments, an uppermost tray 40 comprises a surface onto which interactive device 50 may be removably placed.

In some embodiments, interactive device 50 includes information regarding each of pillows 48, such as, for example, information regarding available sizes, fabric/material(s) and/or features. In some embodiments, interactive device 50 includes information regarding a plurality of mattresses. It is envisioned that interactive device 50 may be configured to select a pillow 48 that provides maximum spinal alignment head and neck support, and open air passage when used in combination with a specific type of mattress by a person having a specific body type and/or sleep position preference (e.g., side sleeper). It is further envisioned that interactive device 50 may be configured to provide a side-by-side comparison of two or more of pillows 48 positioned in compartments 46.

Figure 8:
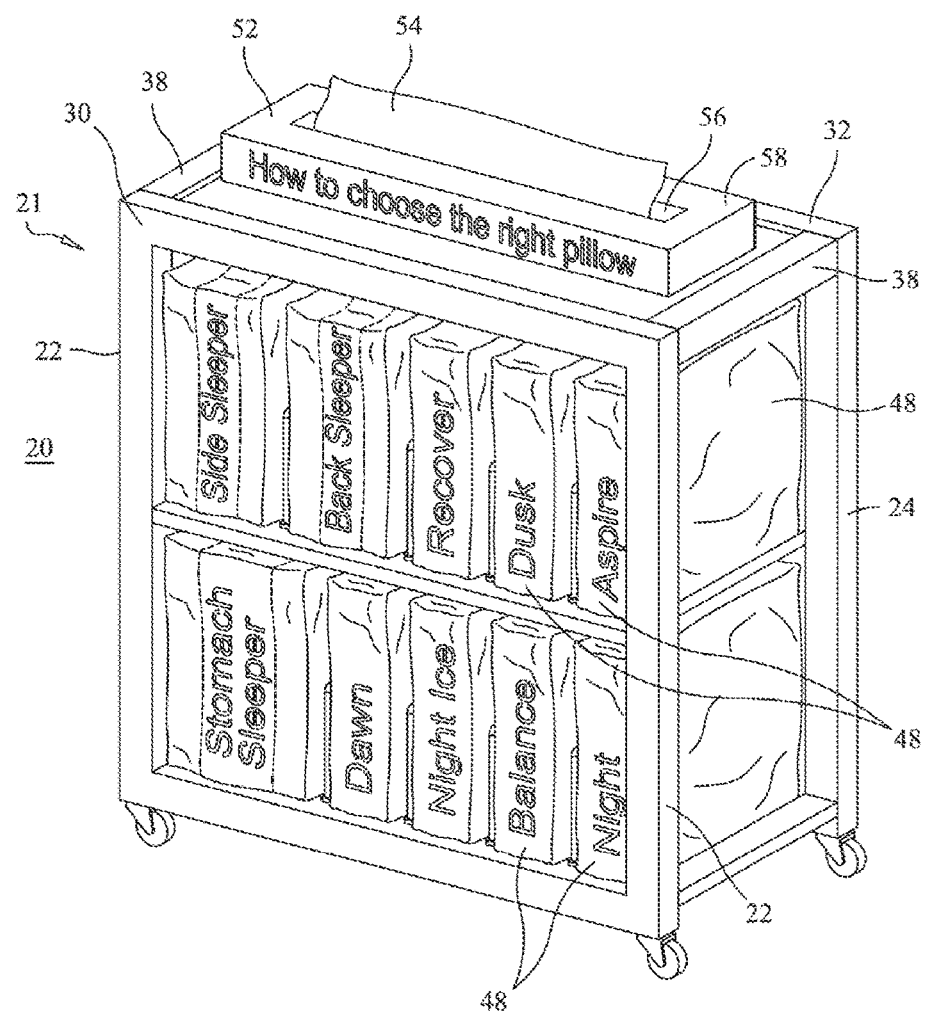
FIG. 8 is a perspective view of one embodiment of a pillow display system in accordance with the principles of the present disclosure.

In one embodiment, shown in FIG. 8, system 20 includes a dispenser 52 that includes one or more disposable barriers, such as, for example, disposable pillow covers 54 configured to cover at least a portion of each pillow 48. In some embodiments, dispenser 52 has a substantially rectangular configuration and includes a substantially rectangular opening 56 extending through an upper surface 58 of dispenser 52. It is envisioned that dispenser 52 and/or opening 56 may have various shape configurations, such as, for example, square, circular, oval, oblong, polygonal, irregular, uniform, non-uniform, variable and/or tapered, depending upon the requirements of a particular application. It is further envisioned that opening 56 may extend through any surface of dispenser 52, such as, for example a side surface or an end surface. An inner surface of dispenser 52 defines a cavity having disposable pillow covers 54 disposed therein. In some embodiments, dispenser 52 includes indicia printed on an exterior surface thereof, such as, for example, indicia that teaches a consumer how to choose the pillow 48 that will provide the best spinal alignment based upon the mattress he or she uses and/or his or her body type and/or sleep position preference.

In some embodiments, disposable pillow covers 54 are in the form of a roll. In some embodiments, disposable pillow covers 54 are in the form of a roll that is wound about a spool and cart 21 includes a bracket configured to engage the spool such that the spool is rotatable relative to cart 21. In some embodiments, disposable pillow covers 54 are stacked on top of one another. In some embodiments, there are perforations between adjacent disposable pillow covers 54 to permit a single disposable pillow cover 54 to be separated from the remaining disposable pillow covers 54 without cutting the same with a scissor or other cutting means. In some embodiments, disposable pillow cover 54 is formed from a single unperforated sheet and dispenser 52 includes a cutting means, such as, for example, a serrated edge configured to cut a selected length of disposable pillow cover 54 from the sheet.

In one embodiment, dispenser 52 is removably placed on a top surface of an uppermost tray 40. In some embodiments, cart 21 includes a bracket that is fixed to cart 21 and dispenser 52 is coupled to the bracket. In some embodiments, dispenser 52 is removably disposed in a compartment 46. In some embodiments, dispenser 52 is configured to be positioned at waist level.

Figure 9:
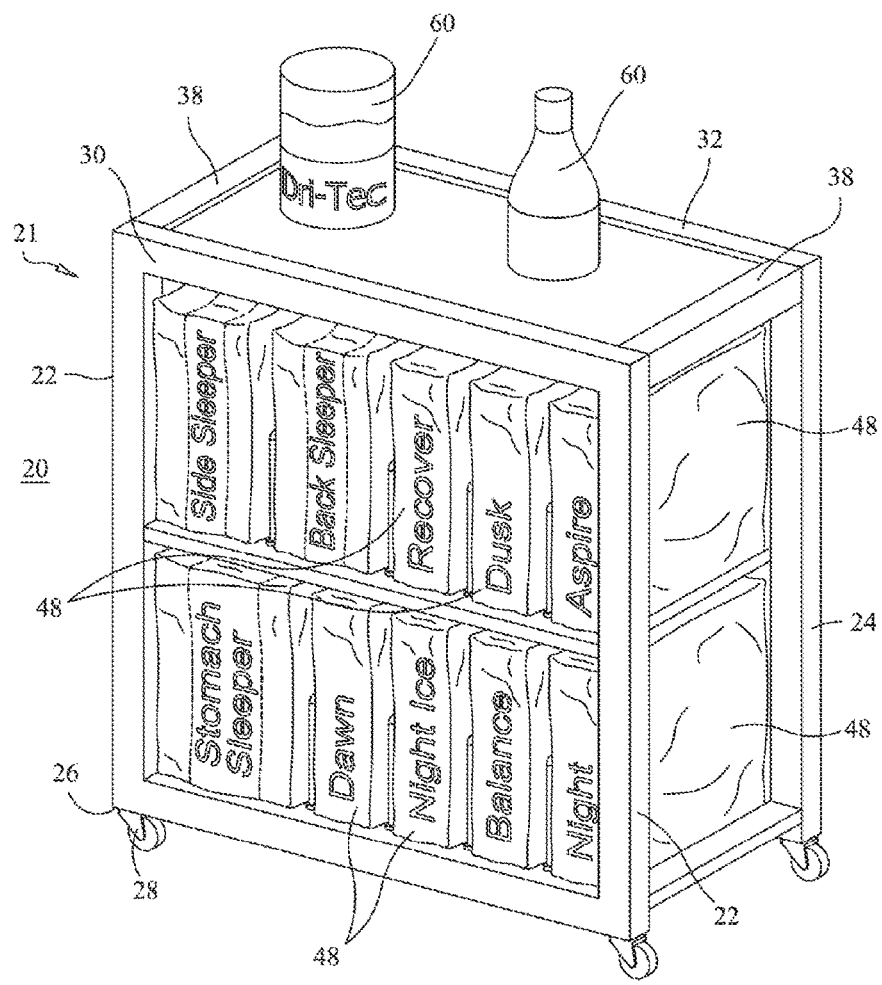
FIG. 9 is a perspective view of one embodiment of a pillow display system in accordance with the principles of the present disclosure.

In one embodiment, shown in FIG. 9, system 20 includes one or more flasks or jars 60 removably placed on a top surface of an uppermost tray 40. In some embodiments, jars 70 are removably disposed in at least one compartment 46. It is envisioned that jars 60 may include samples of material from which pillows 48 are made and/or a means to demonstrate certain performance characteristics of pillows 48.

Figure 10:
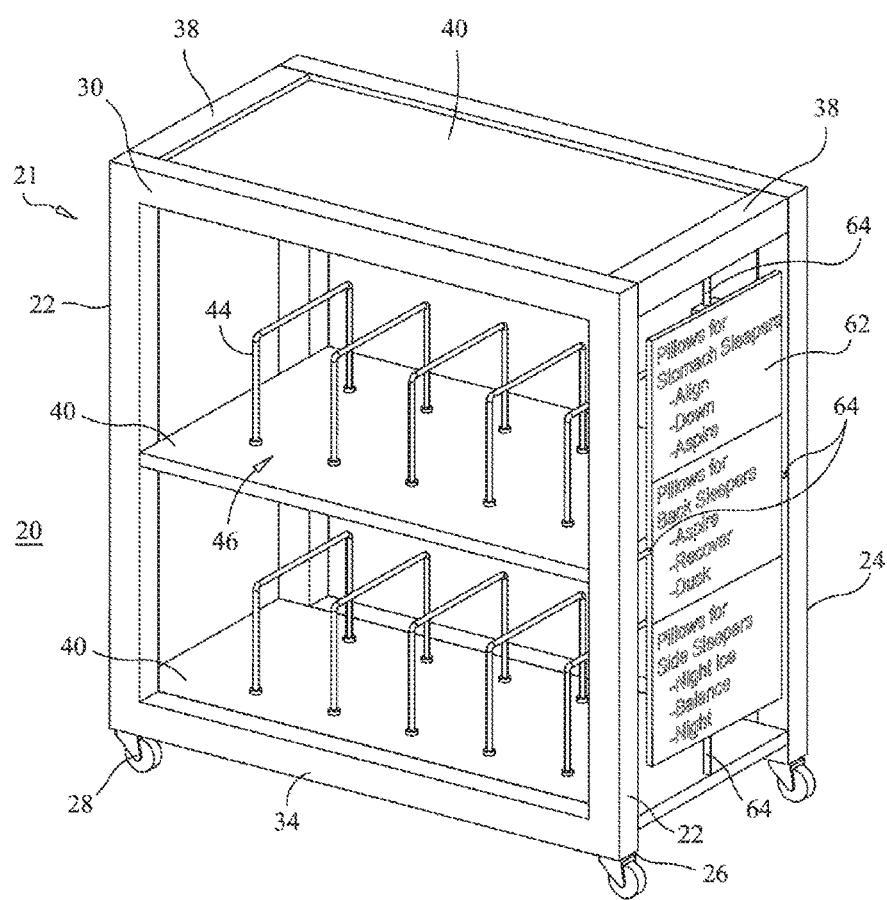
FIG. 10 is a perspective view of a component of one embodiment of a pillow display system in accordance with the principles of the present disclosure.

In one embodiment, shown in FIGS. 10-12, cart 21 includes graphic display signage 62 positioned such that signage 62 is visible from an exterior of cart 21. In some embodiments, signage 62 is positioned at one end of cart 21, between a support member 22 and an adjacent support member 24 and between a support member 38 and a tray 40, as shown in FIG. 10. In one embodiment, the support member 22, the support member 24 and the tray 40 that signage 62 is positioned between each include a mounting brace 64 that engages one side of signage 62 such that signage 62 is positioned between braces 64. It is envisioned that signage 62 may be positioned anywhere relative to cart 21. For example, signage 62 may be coupled to cross member 30, cross member 32, cross member 34, cross member 36, one of support members 38 or one of trays 40.

Signage 62 provides details or instructions that teach a consumer how to choose a pillow from pillows 48 that will provide the proper spinal alignment in combination with a selected mattress. In one embodiment, signage 62 provides details or instructions that teach a consumer how to choose a pillow from pillows 48 that will provide maximum spinal alignment independent of the mattress used. In some embodiments, signage 62 provides information regarding one or more of pillows 48, such as, for example, the material or materials used to make each pillow 48, structural characteristics of each pillow 48 and the benefits provided by each pillow 48.

In operation and use, cart 21 is positioned adjacent a bed or mattress in a store showroom or other location. In one embodiment, cart 21 is rolled from a remote location to a location adjacent one or more mattresses. Prior to selecting one of pillows 48 from compartments 46, a consumer may choose to read information about pillows 48 on interactive device 50, dispenser 52, jar 60 and/or signage 62 to assist in making their selection. The consumer may then select one of pillows 48 based on such information and remove the selected pillow 48 from a respective compartment 48. For example, in some embodiments, interactive device 50 includes an icon representing each of pillows 48. Selecting one of the icons provides information about the pillow 48 the icon represents. The consumer may then select one of pillows 48 based on such information and remove the selected pillow 48 from a respective compartment 48.

In some embodiments, the consumer may navigate an interface, such as, for example a touchscreen or keyboard of interactive device 50, and select an icon on interactive device 50 representing one of pillows 50 such that interactive device 50 provides information regarding the selected pillow 48. It is envisioned that after reading information on interactive device 50 regarding the selected pillow 48, the consumer may then select another icon on interactive device representing a second pillow 48 such that interactive device 50 provides information regarding the second selected pillow 48. Interactive device 50 may then provide a side by side comparison of the selected pillow 48 and the second selected pillow 48 on interactive device 50. The consumer may then select one of pillows 48 based on such a comparison and remove the selected pillow 48 from a respective compartment 48.

In addition to or as an alternative to reading and/or comparing information about pillows 48 on interactive device 50, dispenser 52, jar 60 and/or signage 62, the consumer may enter personal information into interactive device 50 such as, for example, his or her height, weight and/or sleep position preference, which will prompt interactive device 50 to present information on a display relating to pillows 48 that would provide proper spinal alignment based on the information the consumer input into interactive device 50. The consumer may then select one of pillows 48 based on such information and remove the selected pillow 48 from a respective compartment 48.

Prior to testing the selected pillow 48, the consumer may obtain a single disposable pillow cover 54 from dispenser 52. The selected pillow 48 may then be placed on top of the mattress, with the single disposable pillow cover 54 placed on top of the selected pillow 48. The consumer may then lie on the mattress and test the selected pillow 48 to determine if it provides proper spinal alignment in combination with the mattress. The consumer may then lie on the mattress and/or move around on the mattress to determine if the selected pillow 48 is comfortable to the consumer.

The process discussed in the preceding paragraphs may then be repeated with other pillows 48. For example, the consumer may remove the selected pillow 48 from the mattress and select another pillow 48 from one of compartments 46. It is envisioned that the second selected pillow 48 may be positioned at a level that allows the consumer to pull the second selected pillow 48 from cart 21 while lying on the mattress, without standing. Prior to testing the second selected pillow 48, the consumer may obtain another disposable pillow cover 54 from dispenser 52. It is envisioned that dispenser 52 will be positioned at a level such that the consumer can obtain a disposable pillow cover 54 from dispenser 52 while lying on the mattress, without standing or the salesperson can obtain a disposable pillow cover 54 and hand it to the consumer while the consumer in lying on the mattress. The second selected pillow 48 may then be placed on top of the mattress, with the second disposable pillow cover 54 placed on top of the second selected pillow 48. The consumer may then lie on the mattress and test the second selected pillow 48 to determine if it provides proper spinal alignment in combination with the mattress. The consumer may then lie on the mattress and/or move around on the mattress to determine if the second selected pillow 48 is comfortable to the consumer. In some embodiments, the disposable pillow cover 54 used to test the first selected pillow 48 may also be used to test the second selected pillow 48 as well as additional pillows 48.

The consumer may then compare the first and second selected pillows 48 based on his or her experience. This process can be repeated with any number of pillows 48. It is envisioned that after comparing a desired number of pillows 48, the consumer will purchase the pillow 48 that he or she believes is most comfortable.

In some embodiments, cart 21 is positioned adjacent a second mattress in the same store showroom, the second mattress being spaced apart from the first mattress discussed in the preceding paragraphs. The consumer may then select one of pillows 48 and remove the selected pillow 48 from a respective compartment 48.

The consumer may then lie on the second mattress and test the selected pillow 48 to determine if it provides proper spinal alignment in combination with the second mattress by placing the selected pillow 48 on the second mattress such that the selected pillow 48 is positioned between the second mattress and the consumer's head. The consumer may then lie on the second mattress with his or head on the selected pillow 48 and stay stationary and/or move around on the second mattress to determine if the selected pillow 48 is comfortable to the consumer. This process may then be repeated with other pillows 48. For example, the consumer may remove the selected pillow 48 from the second mattress and select another pillow 48 from one of compartments 46. The consumer may then lie on the second mattress and test the second selected pillow 48 to determine if it provides proper spinal alignment in combination with the second mattress by placing the second selected pillow 48 on the mattress such that the second selected pillow 48 is positioned between the second mattress and the consumer's head. The consumer may then lie on the second mattress with his or head on the second selected pillow 48 and stay stationary and/or move around on the second mattress to determine if the second selected pillow 48 is comfortable to the consumer. The consumer may then compare the tested pillows 48 based on his or her experience. This allows the consumer to choose a pillow 48 that provides the best spinal alignment, and hence optimal comfort, in combination with a selected mattress. This process can be repeated with any number of pillows 48 and/or mattresses. It is envisioned that after comparing a desired number of pillows 48, the consumer will purchase the pillow 48 that he or she believes is most comfortable and/or a mattress and pillow 48 combination that he or she believes is most comfortable. It is further envisioned that disposable pillow covers 54 may be used to test pillows 48 with the second mattress in the same manner as disposable pillow covers 54 were used to test pillows 48 with the first mattress.

In one embodiment, shown in FIGS. 13-22, system 20 includes a pillow cart 66 that is similar to cart 21. Cart 66 includes a frame 68 comprising a lower portion 70 and an upper portion 72 positioned above lower portion 70. Lower portion 70 comprises a first vertical support member 74a, a second vertical support member 74b, a third vertical support member 74c, and fourth vertical support member 74d. Vertical support members 74a-d are spaced apart from one another and extend parallel to one another. In some embodiments, vertical support members 74a-d each have the same height. In some embodiments, vertical support members 74a-d each have a height between about 12 inches and about 24 inches. In some embodiments, vertical support members 74a-d each have a height between that is less than 12 inches. In some embodiments, vertical support members 74a-d each have a height that is greater than 24 inches. In some embodiments, vertical support members 74a-d each have a height that is 19 inches.

Lower portion 70 comprises a first side support member 76a and a second side support member 76b. Side support members 76a, 76b each extend between and connect vertical support members 74a, 74b. Side support members 76a, 76b extend parallel to one another and are spaced apart from one another by vertical support members 74a, 74b. Lower portion 70 comprises a third side support member 76c and a fourth side support member 76d. Side support members 76c, 76d each extend between and connect vertical support members 74c, 74d. Side support members 76c, 76d extend parallel to one another and are spaced apart from one another by vertical support members 74c, 74d. In some embodiments, an inner surface of side support member 76b includes spaced apart tabs 75 configured to support a portion of a first tray, as discussed herein. In some embodiments, an inner surface of side support member 76a includes spaced apart tabs 75 configured to support a portion of a second tray, as discussed herein. In some embodiments, side support members 76a-d each have the same width. In some embodiments, side support members 76a-d each have a width between about 12 inches and about 30 inches. In some embodiments, side support members 76a-d each have a width that is less than 12 inches. In some embodiments, side support members 76a-d each have a width that is greater than 30 inches. In some embodiments, side support members 76a-d each have a width that is 23 inches.

Lower portion 70 comprises a first rear support member 78a and a second rear support member 78b. Rear support members 78a, 78b each extend between and connect vertical support members 74a, 74c. Rear support members 78a, 78b extend parallel to one another and are spaced apart from one another by vertical support members 74a, 74c. In some embodiments, an inner surface of rear support member 78a includes spaced apart tabs 75 configured to support a portion of a first tray, as discussed herein. In some embodiments, an inner surface of rear support member 78b includes spaced apart tabs 75 configured to support a portion of a second tray, as discussed herein.

Lower portion 70 comprises a first front support member 80a and a second front support member 80b. Front support members 80a, 80b each extend between and connect vertical support members 74b, 74d. Front support members 80a, 80b extend parallel to one another and are spaced apart from one another by vertical support members 74b, 74d. In some embodiments, an inner surface of front support member 80a includes spaced apart tabs 75 configured to support a portion of a first tray, as discussed herein. In some embodiments, an inner surface of front support member 80b includes spaced apart tabs 75 configured to support a portion of a second tray, as discussed herein.

In some embodiments, rear support members 78a, 78b and front support members 80a, 80b each have the same width. In some embodiments, rear support members 78a, 78b and front support members 80a, 80b each have a width between about 12 inches and about 40 inches. In some embodiments, rear support members 78a, 78b and front support members 80a, 80b each have a width that is less than 12 inches. In some embodiments, rear support members 78a, 78b and front support members 80a, 80b each have a width that greater than 40 inches. In some embodiments, rear support members 78a, 78b and front support members 80a, 80b each have a width that is 29¼ inches.

In some embodiments, support members 76b, 76d, 78a, 80a define a lower support assembly 70a having a polygonal configuration, such as, for example, a rectangular configuration. Lower support assembly 70a is configured to support a first tray, as discussed herein. Support members 76a, 76c, 78b, 80b define an upper support assembly 70b having a polygonal configuration, such as, for example, a rectangular configuration. Upper support assembly 70b is configured to support a second tray, as discussed herein. In some embodiments, support assembly 70a and/or support assembly 70b may have configurations, such as, for example, circular, oval, oblong, triangular, rectangular, square, polygonal, irregular, uniform, non-uniform, variable, tubular and/or tapered.

Upper portion 72 comprises a first vertical support member 82a, a second vertical support member 82b, a third vertical support member 82c, and fourth vertical support member 82d. Vertical support member 82a is coaxial and/or concentric with vertical support member 74a. Vertical support member 82c is coaxial and/or concentric with vertical support member 74c. Vertical support member 82b has a distal end that engages side support member 76a between the vertical support members 74a, 74b such that vertical support member 82b is offset and/or nonconcentric with vertical support member 74b. Vertical support member 82d has a distal end that engages side support member 76c between the vertical support members 74c, 74d such that vertical support member 82d is offset and/or nonconcentric with vertical support member 74d. Vertical support members 82a-d extend parallel to one another. In some embodiments, vertical support members 82a-d extend parallel vertical support members 74a-d.

In some embodiments, vertical support members 82a-d each have the same height. In some embodiments, vertical support members 82a-d each have a height that is less than heights of vertical support members 74a-d. In some embodiments, vertical support members 82a-d each have a height that is equal to heights of vertical support members 74a-d. In some embodiments, vertical support members 82a-d each have a height that is greater than heights of vertical support members 74a-d. In some embodiments, vertical support members 82a-d each have a height between about 12 inches and about 24 inches. In some embodiments, vertical support members 82a-d each have a height between that is less than 12 inches. In some embodiments, vertical support members 82a-d each have a height that is greater than 24 inches. In some embodiments, vertical support members 82a-d each have a height that is 18 inches.

Upper portion 72 comprises a first side support member 84a that extends between and connects vertical support members 82a, 82b and a second side support member 84b that extends between and connects vertical support members 82c, 82d. Side support members 84a, 84b extend parallel to one another. Side support members 84a, 84b each have the same width. Side support members 84a, 84b each have a width that is less than widths of each of side support members 76a-d. In some embodiments, side support members 84a, 84b each have a width between about 12 inches and about 30 inches. In some embodiments, side support members 84a, 84b each have a width that is less than 12 inches. In some embodiments, side support members 84a, 84b each have a width that is greater than 30 inches. In some embodiments, side support members 84a, 84b each have a width that is 19 inches.

Upper portion 72 comprises a rear support member 86 that extends between and connects vertical support members 82a, 82c and a front support member 88 that extends between and connects vertical support members 82b, 82d. Support members 86, 88 extend parallel to one another. Support members 86, 88 each have the same width. Support members 86, 88 each have a width that is equal to widths of each of support members 78a, 78b, 80a, 80b. In some embodiments, support members 86, 88 each have a width between about 12 inches and about 40 inches. In some embodiments, support members 86, 88 each have a width that is less than 12 inches. In some embodiments, support members 86, 88 each have a width that greater than 40 inches. In some embodiments, support members 86, 88 each have a width that is 29¼ inches.

In some embodiments, support members 84a, 84b, 86, 88 define a top support assembly 72a having a polygonal configuration, such as, for example, a rectangular configuration. Top support assembly 72a is configured to support a third tray, as discussed herein. In some embodiments, support assembly 72a may have configurations, such as, for example, circular, oval, oblong, triangular, rectangular, square, polygonal, irregular, uniform, non-uniform, variable, tubular and/or tapered.

In some embodiments, cart 66 is configured to be fixed to a surface, such as, for example a floor of a building. In such embodiments, one or more of support members 76b, 76d, 78a, 80a may include one or a plurality of holes that extend through thicknesses of support members 76b, 76d, 78a, 80a such that bolts or other fastening devices can be inserted through the holes in support members 76b, 76d, 78a, 80a such that the bolts extend into the floor to fix cart 66 relative to the floor. In some embodiments, cart 66 is configured to be movable. In such embodiments, cart 66 includes casters 90 that are coupled to distal ends of each of the vertical support members 74a-d.

Figure 17:
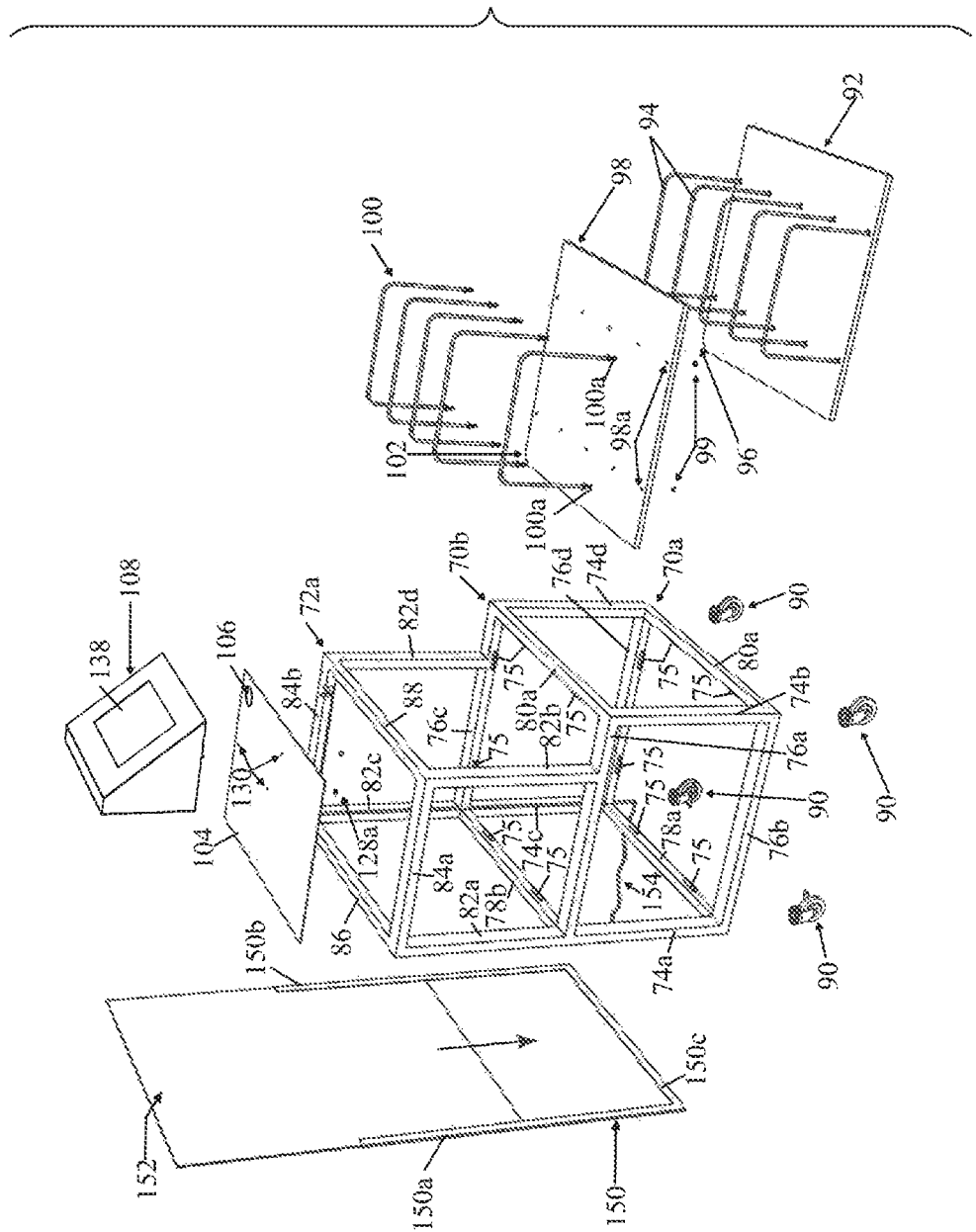
FIG. 17 is a side, perspective view of the pillow display system shown in FIG. 13, with parts separated.

A shelf, such as, for example, a first tray 92 is positioned on top of tabs 75 of support members 76b, 76d, 78a, 80a to couple tray 92 to support assembly 70a. In some embodiments, tray 92 is coupled to support assembly 70a such that outer surfaces of tray 92 engage the inner surfaces of support members 76b, 76d, 78a, 80a and/or a top surface of tray 92 is flush with top surfaces of support members 76b, 76d, 78a, 80a. Tray 92 includes a plurality of spaced apart dividers 94, wherein adjacent dividers 94 define compartments therebetween configured for disposal of an item, such as, for example, a pillow. Dividers 94 may the same or similar to dividers 44 and may be coupled to tray 92 in the same manner that dividers 44 are coupled to tray 40. In some embodiments, dividers 94 each include threaded ends 94a (FIG. 22) that are each positioned in an opening 92a in tray 92. Nuts 95 are threaded onto ends 94a when ends 94a are positioned through openings 92a to fix dividers 94 to tray 92. In some embodiments, tray 92 includes a thumb cut, such as, for example, a cutout 96 that extends through the thickness of tray 92. Cutout 96 is shown in FIG. 17 as being in a corner of tray 92. However, it is envisioned that cutout 96 can be anywhere on tray 92.

A shelf, such as, for example, a second tray 98 is positioned on top of tabs 75 of support members 76a, 76c, 78b, 80b to couple tray 98 to support assembly 70b. In some embodiments, tray 98 is coupled to support assembly 70b such that outer surfaces of tray 98 engage the inner surfaces of support members 76a, 76c, 78b, 80b and/or a top surface of tray 98 is flush with top surfaces of support members 76a, 76c, 78b, 80b. Tray 98 includes a plurality of spaced apart dividers 100, wherein adjacent dividers 100 define compartments therebetween configured for disposal of an item, such as, for example, a pillow. Dividers 100 may the same or similar to dividers 44 and may be coupled to tray 98 in the same manner that dividers 44 are coupled to tray 40. In some embodiments, dividers 100 each include threaded ends 100a (FIG. 17) that are each positioned in an opening 98a in tray 98. Nuts 99 are threaded onto ends 100a when ends 100a are positioned through openings 98a to fix dividers 100 to tray 98. In some embodiments, tray 98 includes a thumb cut, such as, for example, a cutout 102 that extends through the thickness of tray 98. Cutout 102 is shown in FIG. 17 as being in a corner of tray 98. However, it is envisioned that cutout 102 can be anywhere on tray 98. In some embodiments, cutout 102 is aligned with cutout 96 when tray 92 is coupled to support assembly 70a and tray 98 is coupled to support assembly 70b such that cutout 102 is concentric and/or coaxial with cutout 96.

A shelf, such as, for example, a third tray 104 is positioned within support members 84a, 84b, 86, 88 to couple tray 104 to support assembly 72a. In some embodiments, tabs that are the same or similar to tabs 75 extend from inner surfaces of support members 84a, 84b, 86, 88 and tray 104 is positioned on the tabs that extend from the inner surfaces of support members 84a, 84b, 86, 88 to couple tray 104 to support assembly 72a. In some embodiments, tray 104 is coupled to support assembly 72a such that outer surfaces of tray 104 engage the inner surfaces of support members 84a, 84b, 86, 88 and/or a top surface of tray 104 is flush with top surfaces of support members 84a, 84b, 86, 88. Tray comprises a hole 106 that extends through a thickness of tray 104. Hole 106 is shown in FIG. 17 as having a circular cross sectional configuration. However, it is envisioned that hole 106 may have various cross section configurations, such as, for example, oval, oblong, triangular, rectangular, square, polygonal, irregular, uniform, non-uniform, variable, tubular and/or tapered. In some embodiments, hole 106 is offset from cutout 102 and/or cutout 96 when tray 92 is coupled to support assembly 70a, tray 98 is coupled to support assembly 70b and tray 104 is coupled to support assembly 72a. In some embodiments, hole 106 is aligned with cutout 102 and/or cutout 96 when tray 92 is coupled to support assembly 70a, tray 98 is coupled to support assembly 70b and tray 104 is coupled to support assembly 72a such that hole 106 is concentric and/or coaxial with cutout 96 and/or cutout 102.

Figure 20:
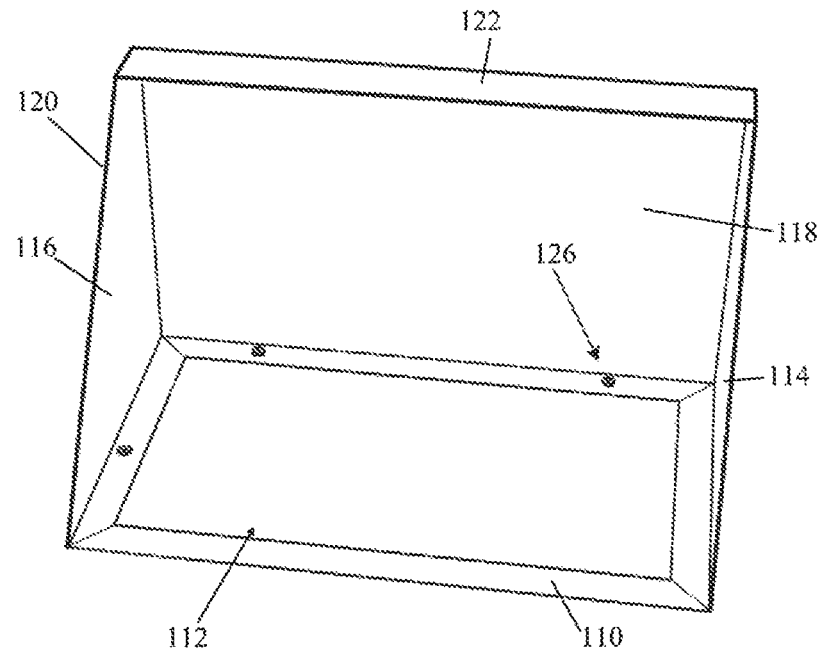
FIG. 20 is a front, perspective view of a component of the pillow display system shown in FIG. 13.
Figure 21:
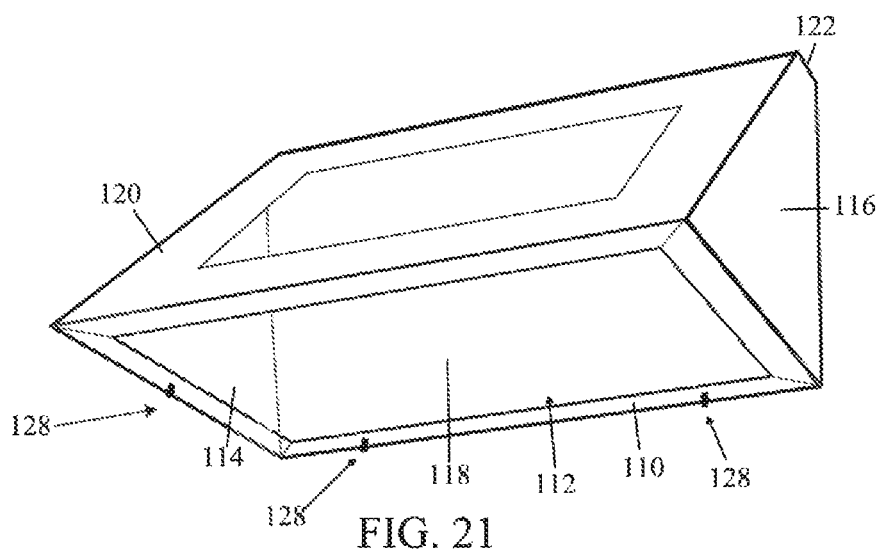
FIG. 21 is a bottom, perspective view of a component of the pillow display system shown in FIG. 13.
Figure 22:
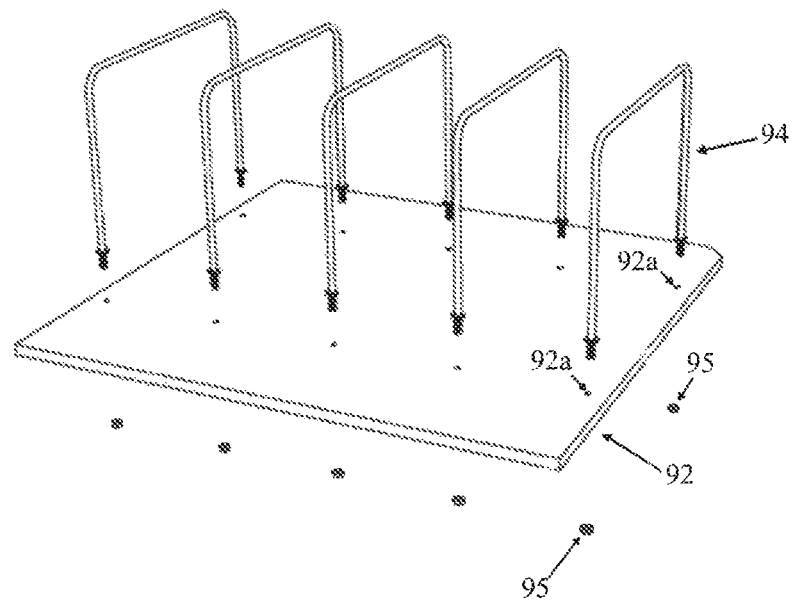
FIG. 22 is a front, perspective view of components of the pillow display system shown in FIG. 13, with parts separated.

A housing 108 is coupled to tray 104 such that housing 108 is fixed relative to tray 104. Housing 108 includes a bottom wall 110 having an aperture 112 that extends through a thickness of wall 110, as best shown in FIGS. 20 and 21. Aperture 112 has a rectangular cross sectional configuration. However, it is envisioned that aperture 112 may have various cross section configurations, such as, for example, circular, oval, oblong, triangular, rectangular, square, polygonal, irregular, uniform, non-uniform, variable, tubular and/or tapered. Housing 108 includes opposite first and second sidewalls 114, 116 that are spaced apart from one another by a rear wall 118 of housing 108. Sidewalls 114, 116 extend parallel to one another and to rear wall 118. In some embodiments, sidewalls 114, 116 and/or rear wall 118 extend perpendicular to bottom wall 110. A front wall 120 extends between sidewalls 114, 116 and between a top wall 122 and bottom wall 110. Top wall 122 extends parallel to bottom wall 110 and front wall 120 extends at an acute angle relative to top wall 122 and bottom wall 110. Front wall 120 includes a cavity 124 that extends through a thickness of front wall 120. Cavity 124 has a rectangular cross sectional configuration. However, it is envisioned that cavity 124 may have various cross section configurations, such as, for example, circular, oval, oblong, triangular, rectangular, square, polygonal, irregular, uniform, non-uniform, variable, tubular and/or tapered.

In some embodiments, housing 108 is fastened into tray 104 to fix housing 108 to tray 104. In some embodiments, bottom wall 110 includes one or a plurality of holes 126, as shown in FIG. 20. Screws or other fastening elements may be positioned through holes 126 and into tray 104 to fix housing 108 to tray 104. In some embodiments, housing 108 is bolted to tray 104 to fix housing 108 to tray 104. In some embodiments, housing 108 includes one or a plurality of threaded shafts 128 that extend outwardly from bottom wall 110 such that shafts 128 extend away from front wall 120 and top wall 122. Shafts 128 are each positioned in one of openings 130 (FIG. 17) in tray 104. A nut 128a is threaded onto each of shafts 128 after shafts 128 are positioned in openings 130 to fix housing 108 to tray 104.

Figure 18:
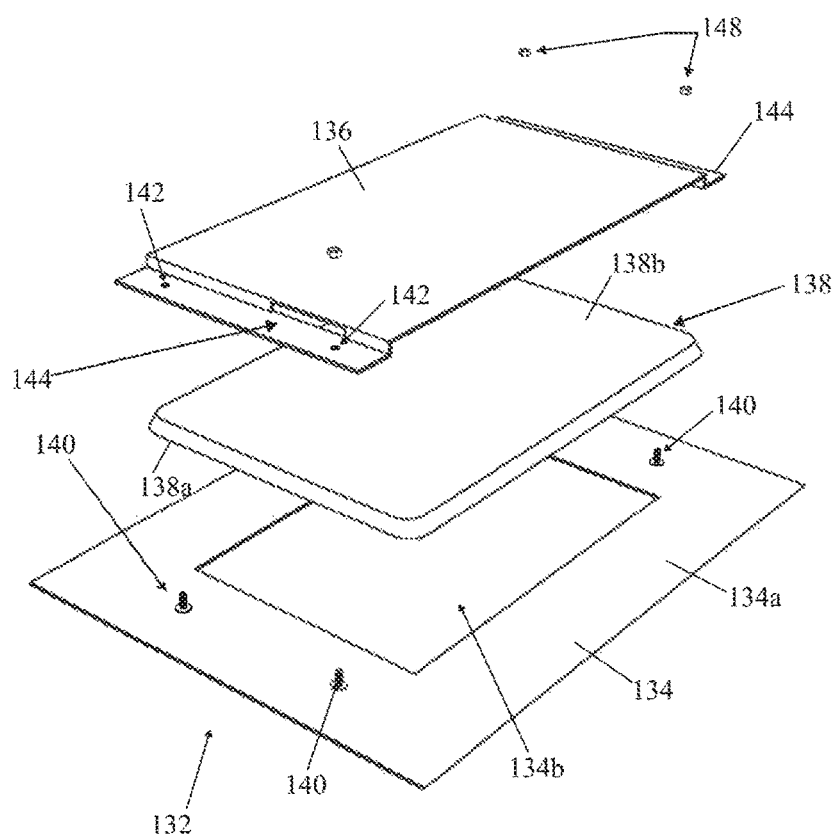
FIG. 18 is a front, perspective view of components of the pillow display system shown in FIG. 13, with parts separated.

An electronic display 132 is coupled to housing 108. Display 132 includes a front plate 134, a back plate 136 and a touchscreen 138 that is positioned between plates 134, 136, as best shown in FIG. 18. In some embodiments, front plate 134 includes one or a plurality of threaded shafts 140 that extend outwardly from a surface 134a of front plate 134 and back plate 136 includes one or a plurality of openings 142 that extend through flanges 144 of back plate 136. Back plate 136 may include one or a plurality of pieces of cushioning material 146. Touchscreen 138 is positioned between flanges 144 and shafts 140 are inserted through openings 142 such that a surface 138a of touchscreen 138 engages surface 134a and an opposite surface 138b of touchscreen 138 engages material 146. Locking elements, such as, for example, nuts 148 are then threaded onto shafts 140 to fix plates 134, 136 and touchscreen 138 relative to one another, forming display 132. All or a portion of surface 138a of touchscreen 138 includes a touchscreen display. The configuration of display 132 positions the touchscreen display on surface 138a such that the touchscreen display is visible through an aperture 134b of plate 134. Display 132 may be positioned within housing 108 and coupled to housing 108 such that the touchscreen display on surface 138a is visible through cavity 124 of front wall 120 of housing 108.

In some embodiments, plate 134 has a maximum width that is between about 12 inches and about 20 inches. In some embodiments, plate 134 has a maximum width that is less than 12 inches. In some embodiments, plate 134 has a maximum width that is greater than 20 inches. In some embodiments, plate 134 has a maximum width that is 16 inches. In some embodiments, plate 134 has a maximum height that is between about 9 inches and about 15 inches. In some embodiments, plate 134 has a maximum height that is less than 9 inches. In some embodiments, plate 134 has a maximum height that is greater than 15 inches. In some embodiments, plate 134 has a maximum height that is 11⅞ inches. In some embodiments, aperture 134b has a width that is between about 8 inches and about 14 inches. In some embodiments, aperture 134b has a width that is less than 8 inches. In some embodiments, aperture 134b has a width that is greater than 14 inches. In some embodiments, aperture 134b has a width that is 10⅛ inches. In some embodiments, aperture 134b has a height that is between about 4 inches and about 10 inches. In some embodiments, aperture 134b has a height that is less than 4 inches. In some embodiments, aperture 134b has a height that is greater than 10 inches. In some embodiments, aperture 134b has a height that is 6¾ inches.

In some embodiments, plate 136 has a maximum width that is between about 10 inches and about 20 inches. In some embodiments, plate 136 has a maximum width that is less than 10 inches. In some embodiments, plate 136 has a maximum width that is greater than 20 inches. In some embodiments, plate 136 has a maximum width that is 14 inches. In some embodiments, plate 136 has a width between flanges 144 that is between about 8 inches and about 16 inches. In some embodiments, plate 136 has a width between flanges 144 that is less than 8 inches. In some embodiments, plate 136 has a width between flanges 144 that is greater than 16 inches. In some embodiments, plate 136 has a width between flanges 144 that is 12 inches. In some embodiments, plate 136 has a maximum height that is between about 4 inches and about 10 inches. In some embodiments, plate 136 has a maximum height that is less than 4 inches. In some embodiments, plate 136 has a maximum height that is greater than 10 inches. In some embodiments, plate 136 has a maximum height that is 6¾ inches.

In some embodiments, touchscreen 138 has a maximum width that is between about 8 inches and about 16 inches. In some embodiments, touchscreen 138 has a maximum width that is less than 8 inches. In some embodiments, touchscreen 138 has a maximum width that is greater than 16 inches. In some embodiments, touchscreen 138 has a maximum width that is 11⅞ inches. In some embodiments, touchscreen 138 has a maximum height that is between about 4 inches and about 12 inches. In some embodiments, touchscreen 138 has a maximum height that is less than 4 inches. In some embodiments, touchscreen 138 has a maximum height that is greater than 12 inches. In some embodiments, touchscreen 138 has a maximum height that is 8 inches.

In some embodiments, touchscreen 138 is between 12 inches and 18 inches, measured on a diagonal. In some embodiments, touchscreen 138 is less than 12 inches, measured on a diagonal. In some embodiments, touchscreen 138 is greater than 18 inches, measured on a diagonal. In some embodiments, touchscreen 138 is configured to run on Android 5.1 or better, such as, for example, lollipop or larger. In some embodiments, touchscreen 138 includes at least one USB 2.0 port. In some embodiments, touchscreen 138 includes at least one USB 3.0 port. In some embodiments, touchscreen 138 includes a battery that can last for 24 hours or longer. In some embodiments, touchscreen 138 is configured for 802.11 b/g/n support. In some embodiments, touchscreen 138 is configured for 2.4 Ghz support. In some embodiments, touchscreen 138 includes kiosk software.

Figure 19:
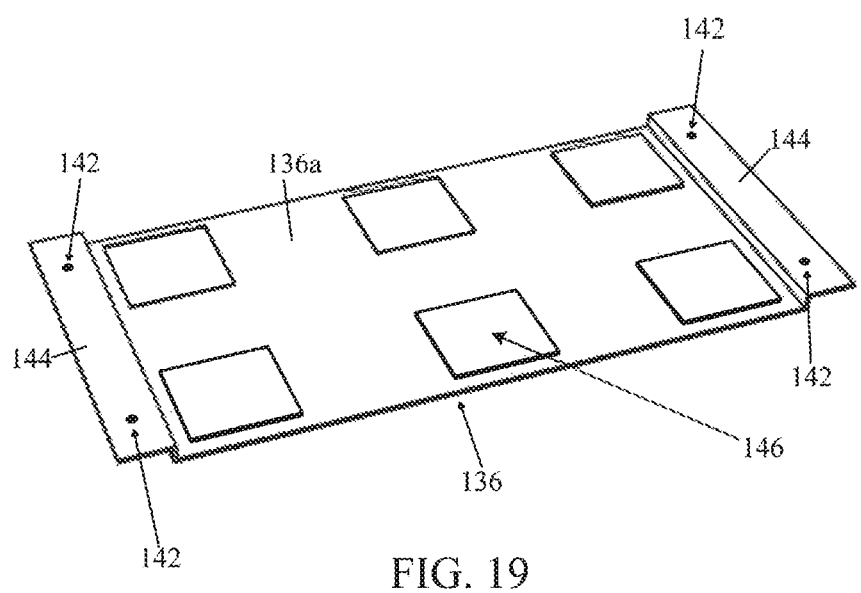
FIG. 19 is a front, perspective view of a component of the pillow display system shown in FIG. 13.

In some embodiments, material 146 may be a foam cushioning material or any other material that provides cushioning, such as, for example, Styrofoam, polypropylene, polyethylene, and polyurethane. In some embodiments, material 146 is attached to surface 136a using an adhesive. As shown in FIG. 19, plate 136 includes a plurality of pieces of material 146 that are uniformly spaced apart from one another. However it is envisioned that material 146 may be a single piece of material that extends continuously from one of flanges 144 to the other one of flanges 144.

In some embodiments, cart 66 includes a bracket 150 that is coupled to frame 68. Bracket 150 includes a first side 150a that is coupled to support members 74a, 82a, a second side 150b that is coupled to support members 74c 82c and a horizontal portion 150c that is coupled to support member 78a to couple bracket 150 to housing 68. Sides 150a, 150b and portion 150c each have a channel configuration configured for disposal of a panel 152. In some embodiments, first side 150a has a length that is equal to the combined lengths of support members 74a, 82a, second side 150b has a length that is equal to the combined lengths of support members 74c 82c and a horizontal portion 150c has a width that is equal to the length of support member 78a.

In operation and use, dividers 94 are coupled to tray 92, as discussed herein, and tray 92 is positioned relative to frame 68 such that tray 92 rests on top of tabs 75 that extend from the inner surfaces of support members 76b, 76d, 78a, 80a to couple tray 92 to support assembly 70a. In some embodiments, tray 92 may be variously coupled to tabs 75 that extend from the inner surfaces of support members 76b, 76d, 78a, 80, such as, for example, monolithic, integral connection, frictional engagement, threaded engagement, mutual grooves, screws, adhesive, nails, barbs and/or raised element. In some embodiments, a pillow, such as, for example, one of pillows 48 may be positioned in one or more of the compartments defined by dividers 94. In some embodiments, other items, such as for example, articles of bedding may be positioned within one or more of the compartments defined by dividers 94 in place of, or in addition to, pillows 48.

Dividers 100 are coupled to tray 98, as discussed herein, and tray 98 is positioned relative to frame 68 such that tray 98 rests on top of tabs 75 that extend from the inner surfaces of support members 76a, 76c, 78b, 80b to couple tray 98 to support assembly 70b. In some embodiments, tray 98 may be variously coupled to tabs 75 that extend from the inner surfaces of support members 76a, 76c, 78b, 80b, such as, for example, monolithic, integral connection, frictional engagement, threaded engagement, mutual grooves, screws, adhesive, nails, barbs and/or raised element. In some embodiments, a pillow, such as, for example, one of pillows 48 may be positioned in one or more of the compartments defined by dividers 100. In some embodiments, other items, such as for example, articles of bedding may be positioned within one or more of the compartments defined by dividers 100 in place of, or in addition to, pillows 48.

Tray 104 is positioned on the tabs that extend from the inner surfaces of support members 84a, 84b, 86, 88 to couple tray 104 to support assembly 72a. In some embodiments, tray 104 may be variously coupled to tabs 75 that extend from the inner surfaces of support members 84a, 84b, 86, 88, such as, for example, monolithic, integral connection, frictional engagement, threaded engagement, mutual grooves, screws, adhesive, nails, barbs and/or raised element. Display 132 is assembled as discussed herein and is positioned within housing 108 such that the touchscreen display on surface 138a of touchscreen 138 is visible through cavity 124 of front wall 120 of housing 108. Housing 108 is then coupled to tray 104. In some embodiments, touchscreen 138 includes a cable, such as, for example, wiring 154 that extends from touchscreen 138 to connect touchscreen 138 to another device, such as, for example, a power source, or another electronic device, such as, for example, a computer, tablet, etc. In such embodiments, wiring 154 is positioned through hole 106, cutout 102 and/or cutout 96. In some embodiments, wiring 154 may be coupled to frame 68 to fix all or a portion of wiring 154 relative to frame 68. It is envisioned that wiring 154 may be coupled to frame 68 using adhesive, wire ties, etc. In some embodiments, wiring 154 is removably connected to touchscreen 138 such that wiring 154 can first be coupled to frame 68 and then connected to touchscreen 138 after wiring 154 is coupled to frame 68. Bracket 150 is coupled to frame 68 in the manner discussed herein and panel 152 is coupled to bracket 150. In some embodiments, wiring 154 is 10 feet long or longer.

Figure 13:
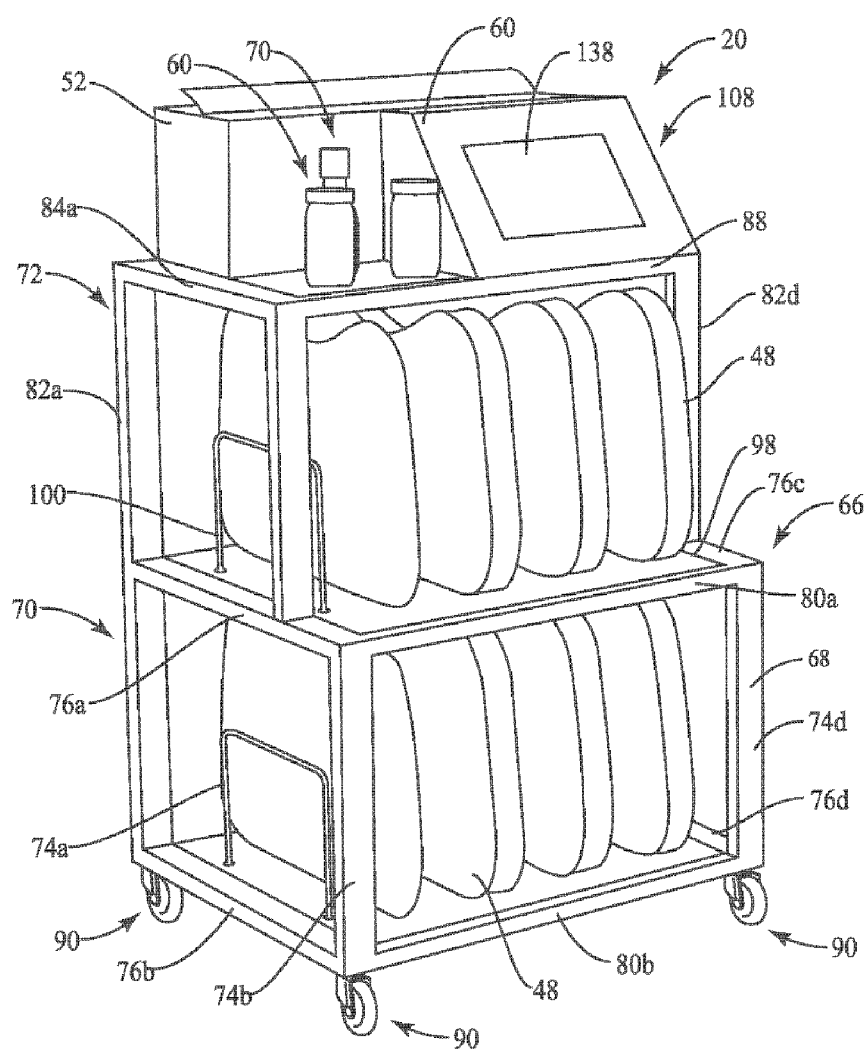
FIG. 13 is a front, perspective view of one embodiment of a pillow display system in accordance with the principles of the present disclosure.
Figure 14:
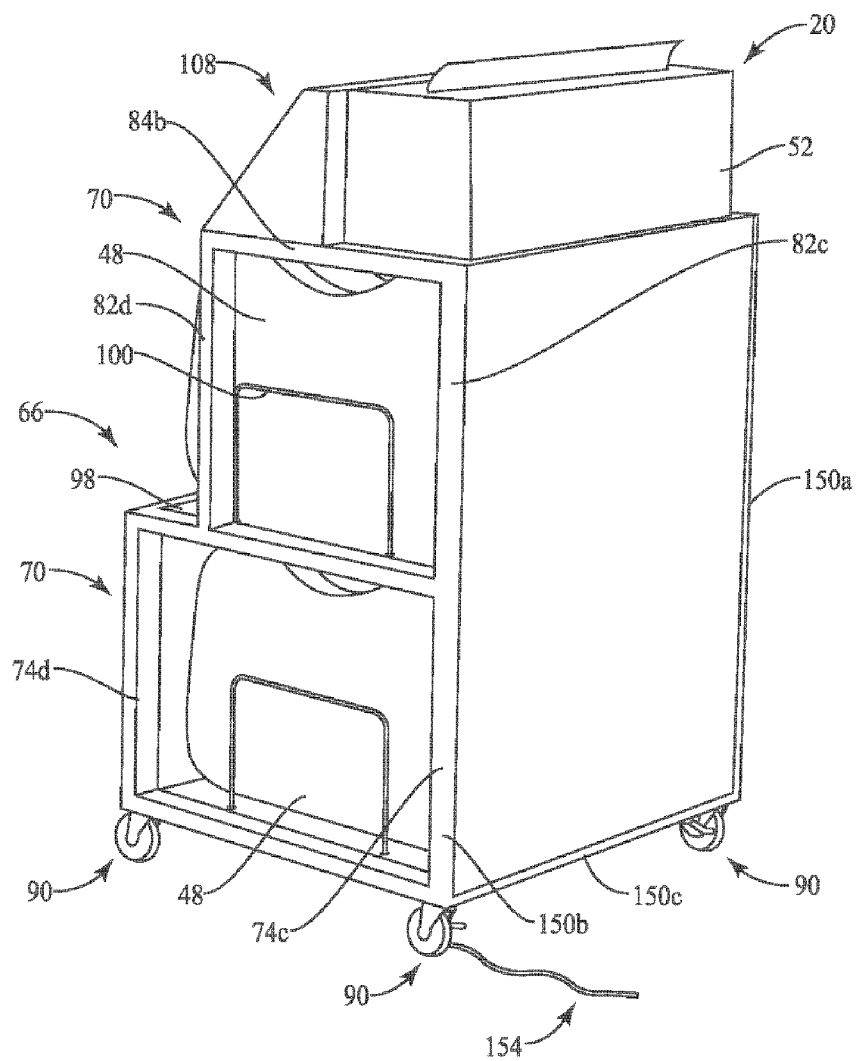
FIG. 14 is a side, perspective view of the pillow display system shown in FIG. 13.
Figure 15:
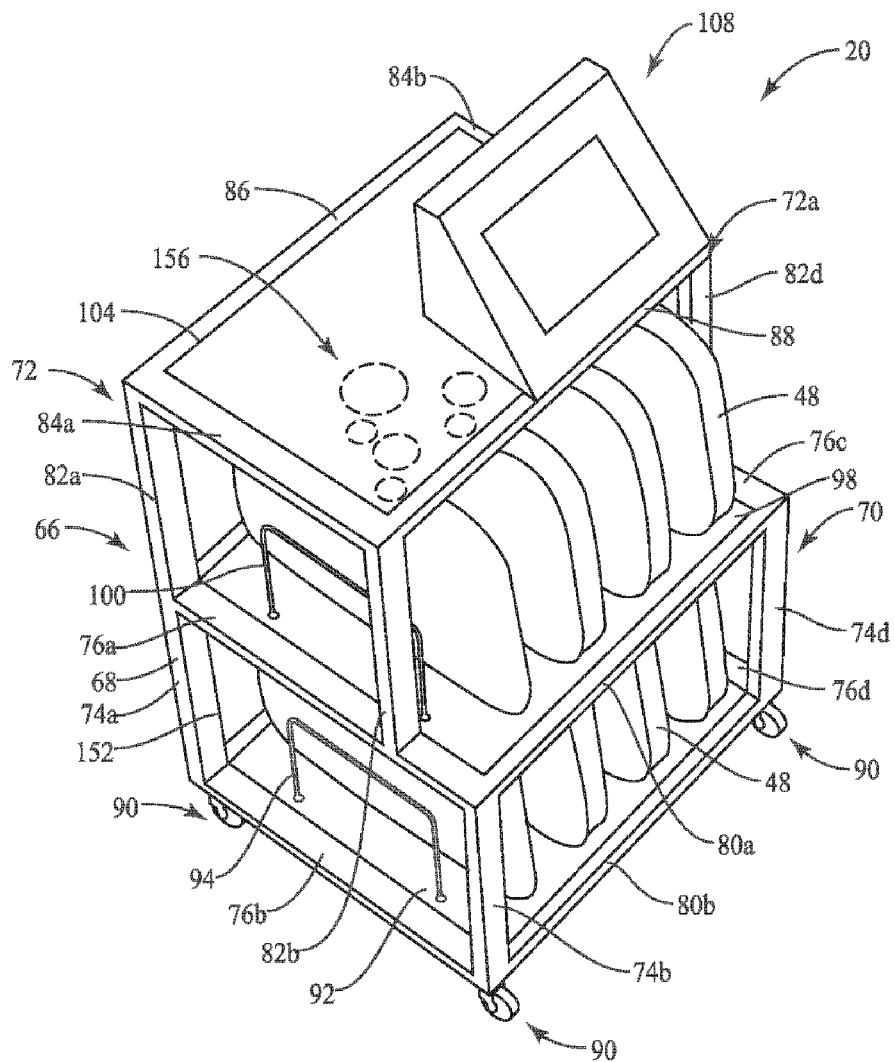
FIG. 15 is a top, perspective view of the pillow display system shown in FIG. 13.
Figure 16:
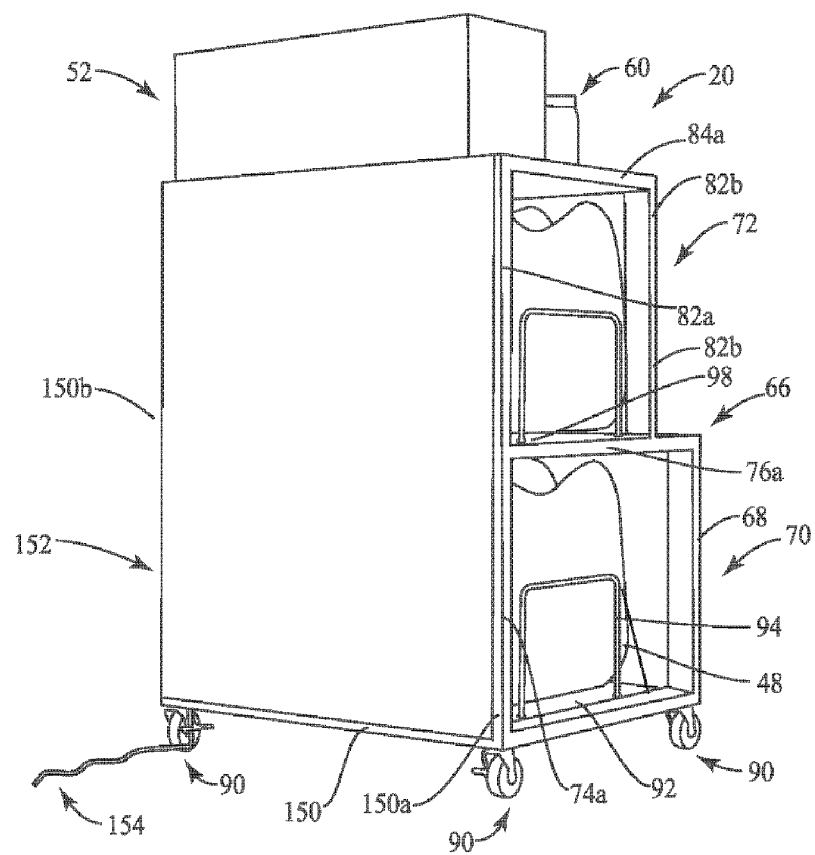
FIG. 16 is a rear, perspective view of the pillow display system shown in FIG. 13.

Tray 104 is configured to have selected items positioned on tray 104. In some embodiments, a dispenser, such as, for example, dispenser 52 is positioned on tray 104. Dispenser 54 may be positioned on tray 104 such that a front surface of tray 104 engages rear wall 118 of housing 108, as shown in FIGS. 13 and 14. In some embodiments, one or a plurality of jars or flasks, such as, for example, jars 60 and/or jars 70 may be positioned on tray 104. In some embodiments, tray 104 includes graphics, such as, for example, graphics 156 (FIG. 15) and one or more of jars 60 and/or jars 70 are positioned within graphics 156.

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A pillow cart comprising:
   a frame;
   a first tray coupled to the frame, the first tray comprising spaced apart dividers that define compartments between adjacent dividers;
   a second tray coupled to the frame;
   a housing coupled to the second tray; and
   pillows positioned in the compartments, at least one of the pillows comprising front and back panels and a gusset positioned between the front and back panels, the gusset comprising a material that is different from materials that comprise the front and back panels.

2. A pillow cart as recited in claim 1, wherein the gusset comprises a breathable material.

3. A pillow cart as recited in claim 1, wherein the gusset comprises a mesh material.

4. A pillow cart as recited in claim 1, wherein the gusset is more porous than the panels.

5. A pillow cart as recited in claim 1, wherein the frame comprises:
   a lower portion comprising a lower support assembly, an upper support assembly, and spaced apart vertical members that extend between and connect the lower support assembly and the upper support assembly, the first tray being coupled to the upper support assembly; and
   an upper portion comprising a top support assembly, the upper portion comprising spaced apart vertical members that extend between and connect the upper support assembly and the top support assembly, the second tray being coupled to the top support assembly.

6. A pillow cart as recited in claim 5, wherein the support assemblies each have a polygonal configuration.

7. A pillow cart as recited in claim 1, further comprising an electronic display coupled to the housing.

8. A pillow cart as recited in claim 7, wherein the first tray includes a cutout, the second tray includes a hole that extends through a thickness of the second tray, and the electronic display includes a touch screen and wiring that extends from the electronic display and through the hole and the cutout.

9. A pillow cart as recited in claim 1, further comprising spaced apart casters that are each coupled to a lower portion of the frame.

10. A pillow cart as recited in claim 1, wherein the dividers are wire dividers that each include a threaded end that is positioned through an opening in the first tray, the pillow cart comprising nuts that each threaded onto one of the threaded ends to fix the dividers to the first tray.

11. A pillow cart as recited in claim 1, further comprising a dispenser positioned on top of the second tray, the dispenser comprising a plurality of disposable pillow covers.

12. A pillow cart as recited in claim 1, further comprising a plurality of jars positioned on top of the second tray, the jars each including samples of materials from which pillows are made.

13. A pillow cart comprising:
    a frame;
    a first tray coupled to the frame, the first tray comprising spaced apart dividers that define compartments between adjacent dividers; and
    pillows positioned in the compartments, at least one of the pillows comprises front and back panels and a gusset positioned between the front and back panels, the gusset comprising a material that is different from materials that comprise the front and back panels.

14. A pillow cart as recited in claim 13, further comprising:
    a second tray coupled to the frame;
    a housing coupled to the second tray; and
    an electronic display coupled to the housing.

15. A pillow cart as recited in claim 14, wherein the first tray includes a cutout, the second tray includes a hole that extends through a thickness of the second tray, and the electronic display includes a touch screen and wiring that extends from the electronic display and through the hole and the cutout.

16. A pillow cart as recited in claim 15, wherein the electronic display includes a face plate, a back plate and a touch screen positioned between the plates, the plates being bolted together to maintain the touchscreen between the plates.

17. A pillow cart as recited in claim 15, wherein the back plate comprises a foam cushion that directly engages a surface of the touchscreen that is opposite a display of the touchscreen.

18. A pillow cart as recited in claim 15, wherein the housing is bolted to the second tray.

19. A pillow cart comprising:
    a frame;
    a first tray coupled to the frame, the first tray comprising spaced apart dividers that define compartments between adjacent dividers;
    a second tray coupled to the frame;
    a housing coupled to the second tray;
    an electronic display coupled to the housing;
    pillows positioned in the compartments, at least one of the pillows comprising front and back panels and a gusset positioned between the front and back panels, the gusset comprising a material that is different from materials that comprise the front and back panels;
    a dispenser positioned on top of the second tray, the dispenser comprising a plurality of disposable pillow covers; and
    a plurality of jars positioned on top of the second tray, the jars each including samples of materials from which pillows are made.

20. A pillow cart as recited in claim 11, wherein the pillow covers include perforations between adjacent pillow covers to permit one of the pillow covers to be separated from other pillow covers.

* * * * *